(12) United States Patent
Cho et al.

(10) Patent No.: US 11,019,288 B2
(45) Date of Patent: May 25, 2021

(54) IMAGE SENSOR

(71) Applicant: SAMSUNG ELECTRONICS CO., LTD., Suwon-si (KR)

(72) Inventors: Soon Ik Cho, Seoul (KR); Takao Ishii, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/536,894

(22) Filed: Aug. 9, 2019

(65) Prior Publication Data

US 2020/0260027 A1 Aug. 13, 2020

(30) Foreign Application Priority Data

Feb. 8, 2019 (KR) .................. 10-2019-0014966

(51) Int. Cl.
  *H04N 5/357* (2011.01)
  *H04N 5/378* (2011.01)
  *H04N 5/363* (2011.01)

(52) U.S. Cl.
  CPC ........... *H04N 5/3575* (2013.01); *H04N 5/363* (2013.01); *H04N 5/378* (2013.01)

(58) Field of Classification Search
  CPC ....... H04N 5/3575; H04N 5/363; H04N 5/378
  See application file for complete search history.

(56) References Cited

U.S. PATENT DOCUMENTS

| | | | |
|---|---|---|---|
| 6,545,624 B2 | 4/2003 | Lee et al. | |
| 6,803,952 B1* | 10/2004 | Watanabe | H04N 5/3575 348/241 |
| 6,937,279 B1* | 8/2005 | Kim | H04N 5/378 348/308 |
| 6,965,407 B2 | 11/2005 | Boemler et al. | |
| 7,230,558 B2 | 6/2007 | Lim | |
| 8,045,031 B2* | 10/2011 | Cieslinski | H04N 5/3658 348/308 |
| 8,724,001 B2 | 5/2014 | Ay | |
| 8,878,959 B2 | 11/2014 | Mabuchi | |
| 9,521,344 B2* | 12/2016 | Lee | H03M 1/56 |
| 9,712,772 B2 | 7/2017 | Kim et al. | |
| 2002/0067303 A1* | 6/2002 | Lee | H04N 5/378 341/184 |
| 2005/0253942 A1* | 11/2005 | Muramatsu | H04N 9/083 348/273 |
| 2007/0008206 A1 | 1/2007 | Tooyama et al. | |

(Continued)

FOREIGN PATENT DOCUMENTS

KR 10-2016-0121189 10/2016

*Primary Examiner* — Abdelaaziz Tissire

(74) *Attorney, Agent, or Firm* — F. Chau & Associates, LLC

(57) ABSTRACT

An image sensor including: a pixel array having a plurality of pixels connected to a plurality of row lines and a plurality of column lines; a plurality of ramp buffers configured to output a ramp voltage generated by a ramp voltage generator; a sampling circuit including a plurality of samplers, each of the plurality of samplers having a first input terminal for receiving the ramp voltage and a second input terminal connected to one of the plurality of column lines; and a switching circuit configured to connect the first input terminals of the samplers to each other or disconnect the first input terminals of the samplers from each other.

20 Claims, 34 Drawing Sheets

(56) References Cited

U.S. PATENT DOCUMENTS

| | | | |
|---|---|---|---|
| 2008/0043128 A1 | 2/2008 | Poonnen et al. | |
| 2009/0115876 A1* | 5/2009 | Totsuka | H04N 5/3692 348/294 |
| 2010/0171853 A1* | 7/2010 | Kondo | H04N 5/378 348/294 |
| 2013/0206961 A1* | 8/2013 | Ikeda | H01L 27/14601 250/208.1 |
| 2016/0301891 A1* | 10/2016 | Kim | H04N 5/3658 |

* cited by examiner

PA1

|  | COL0 | COL1 | COL2 | COL3 | COL4 | COL5 | ... | COLN-2 | COLN-1 |
|---|---|---|---|---|---|---|---|---|---|
| ROW0 | R | Gr | R | Gr | R | Gr | ... | R | Gr |
| ROW1 | Gb | B | Gb | B | Gb | B | ... | Gb | B |
| ROW2 | R | Gr | R | Gr | R | Gr | ... | R | Gr |
| ROW3 | Gb | B | Gb | B | Gb | B | ... | Gb | B |
| ... | ... | ... | ... | ... | ... | ... | ... | ... | ... |
| ROWM-2 | R | Gr | R | Gr | R | Gr | ... | R | Gr |
| ROWM-1 | Gb | B | Gb | B | Gb | B | ... | Gb | B |

IMAGE SENSOR

CROSS-REFERENCE TO RELATED APPLICATION

This application claims priority under 35 U.S.C. § 119 to Korean Patent Application No. 10-2019-0014966 filed on Feb. 8, 2019 in the Korean Intellectual Property Office, the disclosure of which is incorporated by reference herein in its entirety.

TECHNICAL FIELD

Exemplary embodiments of the present inventive concept relate to an image sensor.

DISCUSSION OF RELATED ART

An image sensor is a semiconductor-based sensor for receiving light and generating an electrical signal to make an image. An image sensor may include a pixel array having a plurality of pixels, a logic circuit for driving the pixel array and generating an image, and the like. An image sensor may also include a photodiode for reacting to external light and generating an electric charge, a pixel circuit for converting the electric charge generated by the photodiode into an electrical signal, and the like. An image sensor may be applied to smartphones, tablet personal computers (PCs), laptop computers, televisions, vehicles, and the like, in addition to cameras for generating images or videos. Noise can negatively affect the quality of an image produced by an image sensor. Recently, a variety of methods for improving noise properties of an image sensor have been developed.

SUMMARY

According to an exemplary embodiment of the present inventive concept, an image sensor includes a pixel array having a plurality of pixels connected to a plurality of row lines and a plurality of column lines; a plurality of ramp buffers configured to output a ramp voltage generated by a ramp voltage generator; a sampling circuit including a plurality of samplers, each of the plurality of samplers having a first input terminal for receiving the ramp voltage and a second input terminal connected to one of the plurality of column lines; and a switching circuit configured to connect the first input terminals of the samplers to each other or disconnect the first input terminals of the samplers from each other.

According to an exemplary embodiment of the present inventive concept, an image sensor includes a pixel array having a plurality of first pixels connected to a first column line and a plurality of second pixels connected to a second column line; a plurality of ramp voltage paths for receiving a ramp voltage output by a ramp voltage generator; a first sampler connected to at least one of the ramp voltage paths and to the first column line; a second sampler connected to at least one of the ramp voltage paths and to the second column line; and a control logic configured to connect the first sampler and the second sampler to one of the ramp voltage paths in common in a first mode, and connect the first sampler and the second sampler to different ramp voltage paths in a second mode different from the first mode.

According to an exemplary embodiment of the present inventive concept, an image sensor includes a sampler having a first input terminal for receiving a ramp voltage, and a second input terminal connected to a plurality of pixels through a column line; a first ramp voltage path and a second ramp voltage path for providing the ramp voltage; a switching circuit configured to select at least one of the first ramp voltage path and the second ramp voltage path and connect the selected ramp voltage path to the first input terminal; and a control logic configured to control the switching circuit such that the first ramp voltage path is connected to the first input terminal during a first time period and such that the second ramp voltage path is connected to the first input terminal during a second time period different from the first time period.

BRIEF DESCRIPTION OF DRAWINGS

The above and other features of the present inventive concept will be more clearly understood by describing in detail exemplary embodiments thereof with reference to the accompanying drawings, in which:

FIG. 11 is a schematic diagram illustrating a pixel array included in an image sensor according to an exemplary embodiment of the present inventive concept;

FIG. 20 is a schematic diagram illustrating a pixel array included in an image sensor according to an exemplary embodiment of the present inventive concept;

FIG. 26 is a schematic diagram illustrating a pixel array included in an image sensor according to an exemplary embodiment of the present inventive concept;

DETAILED DESCRIPTION OF THE EMBODIMENT

Figure 1:
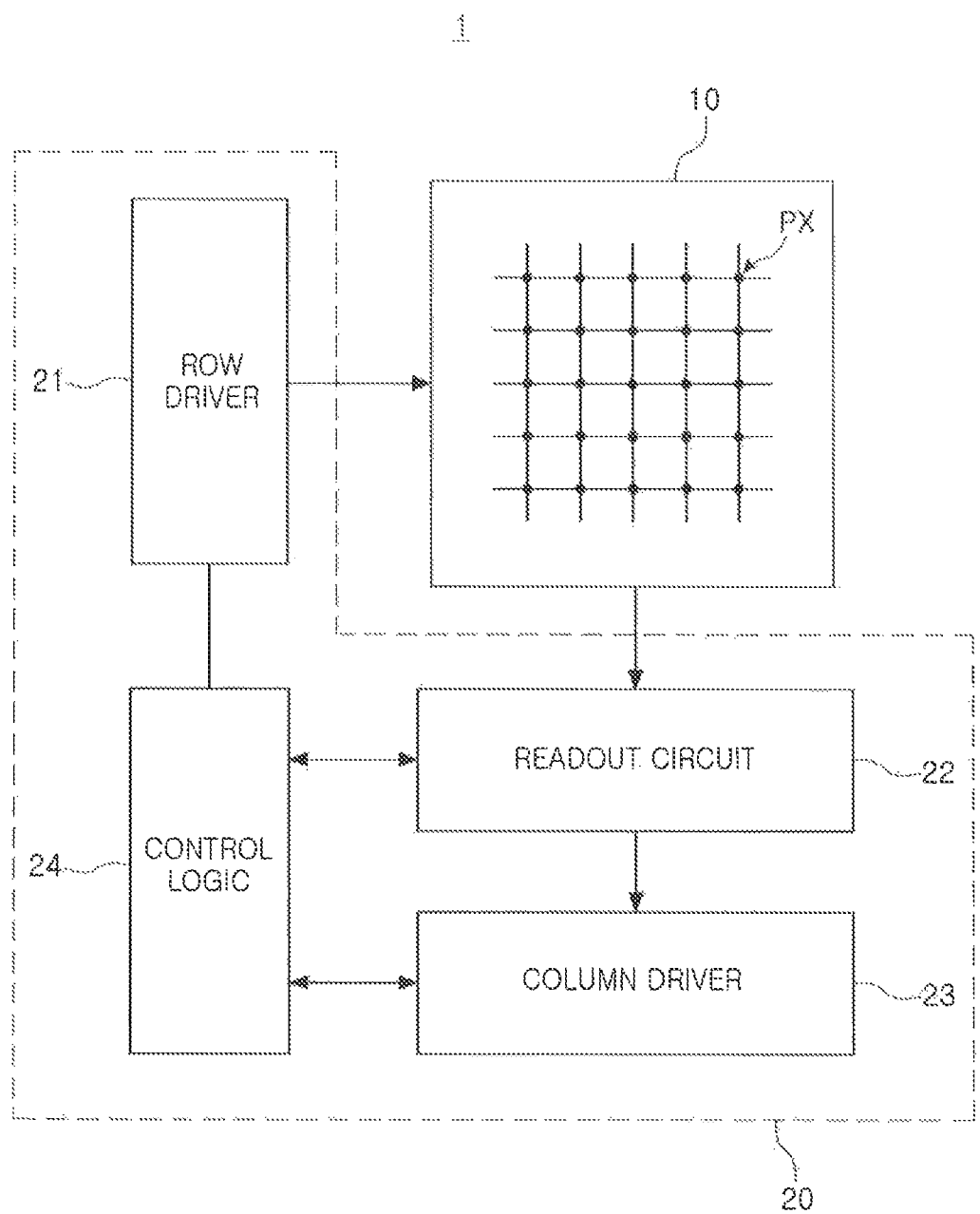
FIG. 1 is a schematic diagram illustrating an image sensor according to an exemplary embodiment of the present inventive concept.

Hereinafter, exemplary embodiments of the present inventive concept will be described in detail with reference to the accompanying drawings. In the drawings, like reference numerals may refer to like elements.

FIG. 1 is a schematic diagram illustrating an image sensor according to an exemplary embodiment of the present inventive concept.

Referring to FIG. 1, an image sensor 1 in the present embodiment may include a pixel array 10 and a controller 20, and the controller 20 may include a row driver 21, a readout circuit 22, a column driver 23, a control logic 24, and the like.

The image sensor 1 may convert light received from an external source into an electrical signal and generate image data. The pixel array 10 included in the image sensor 1 may include a plurality of pixels PX, and the plurality of pixels PX may include an photoelectric device for receiving light and generating an electric charge, such as a photodiode (PD), for example. In exemplary embodiments of the present inventive concept, each of the plurality of pixels PX may include two or more photoelectric devices. Two or more photoelectric devices may be included in each of the plurality of pixels PX to provide an autofocusing function, or to generate pixel signals corresponding to various colors of light, for example, red, green or blue.

Each of the plurality of pixels PX may include a pixel circuit for generating a pixel signal from an electric charge generated by the photodiodes. As an example, the pixel circuit may include a transfer transistor, a drive transistor, a select transistor, a reset transistor, and the like. The pixel circuit in each of the plurality of pixels PX may generate a reset voltage and a pixel voltage, and the pixel signal can be calculated based on the difference between the reset voltage and the pixel voltage. The pixel voltage may be a voltage in which an electric charge generated in the photodiodes included in each of the plurality of pixels PX is reflected. In exemplary embodiments of the present inventive concept, two or more adjacent pixels PX may form a single pixel group, and two or more pixels PX included in a pixel group may share at least one of the transfer transistor, the drive transistor, the select transistor, the reset transistor, and the like, with each other.

The row driver 21 may drive the pixel array 10 by a row unit. For example, the row driver 21 may generate a transfer control signal for controlling the transfer transistor of the pixel circuit, a reset control signal for controlling the reset transistor, a select control signal for controlling the select transistor, and the like.

The readout circuit 22 may include a sampling circuit, an analog-to-digital converter (ADC), and the like. The sampling circuit may include a plurality of samplers, and in the present embodiment, the sampler may be a correlated double sampler (CDS). The sampler may be connected to pixels PX included in a row line selected by the row driver 21, through column lines, and may detect a reset voltage and a pixel voltage from the pixels PX. The sampler may compare each of a reset voltage and a pixel voltage with a ramp voltage, and may output the result of the comparison. The ADC may convert the comparison result output by the samplers into a digital signal and may output the digital signal.

The column driver 23 may include a latch circuit or a buffer circuit for temporarily storing a digital signal, an amplifier circuit, and the like, and may process a digital signal received from the readout circuit 22. The row driver 21, the readout circuit 22, and the column driver 23 may be controlled by the control logic 24. The control logic 24 may include a timing controller for controlling an operational timing of the row driver 21, the readout circuit 22, and the column driver 23. The control logic 24 may also include an image signal processor for processing image data, and the like.

Figure 2:
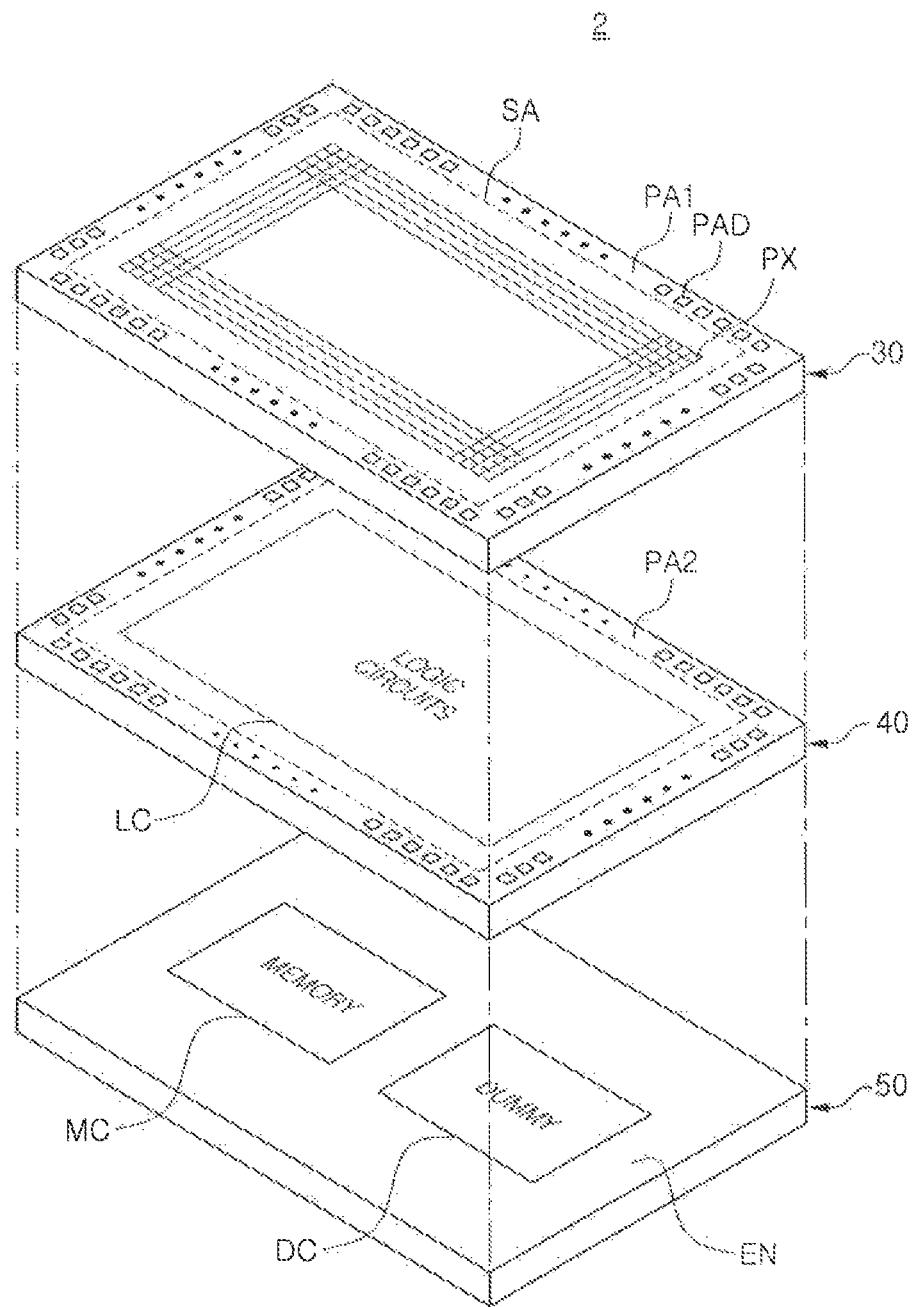
FIGS. 2 and 3 are schematic diagrams illustrating an imaging device including an image sensor according to an exemplary embodiment of the present inventive concept.
Figure 3:
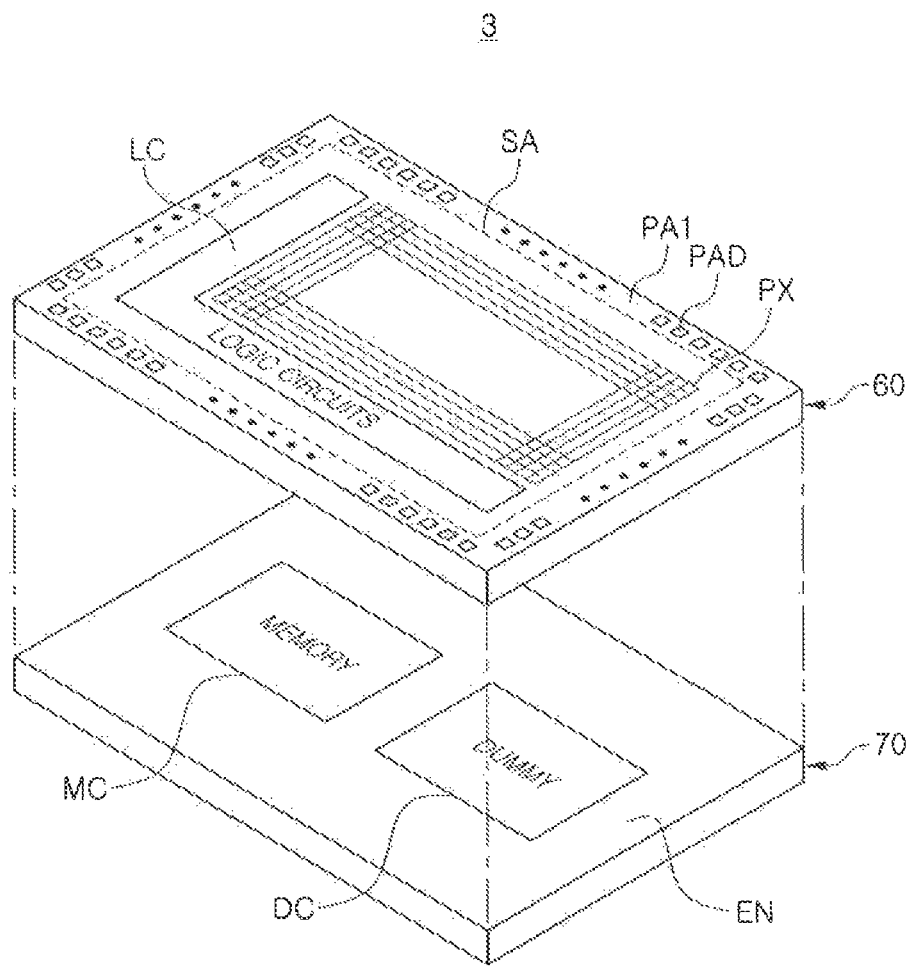

FIGS. 2 and 3 are schematic diagrams illustrating an imaging device including an image sensor according to an exemplary embodiment of the present inventive concept.

Referring to FIG. 2, an imaging device 2 in the present embodiment may include a first layer 30, a second layer 40 arranged on a lower portion of the first layer 30, and a third layer 50 arranged on a lower portion of the second layer 40, and the like. The first layer 30, the second layer 40, and the third layer 50 may be stacked in directions perpendicular to one another. In exemplary embodiments of the present inventive concept, the first layer 30 and the second layer 40 may be stacked on each other in a wafer level, and the third layer 50 may be attached to a lower portion of the second layer 40 in a chip level. The first to third layers 30 to 50 may be provided as a single semiconductor package.

The first layer 30 may include a sensing area SA in which the plurality of pixels PX are arranged, and a first pad area PA1 arranged in a peripheral region of the sensing area SA. The first pad area PA1 may include a plurality of upper pads PAD, and the plurality of upper pads PAD may be connected to pads and a control logic LC arranged in a second pad area PA2 on the second layer 40 through a via VIA, and the like.

Each of the plurality of pixels PX may include a photodiode for receiving light and generating an electric charge, a pixel circuit for processing an electric charge generated by the photodiode, and others. The pixel circuit may include a plurality of transistors for outputting a voltage corresponding to an electric charge generated by the photodiode.

The second layer 40 may include a plurality of devices constituting the control logic LC. The plurality of devices included in the control logic LC may include circuits for driving a pixel circuit arranged in the first layer 30, a row driver, a column driver, a timing controller, and the like, for example. The plurality of devices included in the control logic LC may be connected to a pixel circuit through the first and second pad areas PA1 and PA2. The control logic LC may obtain a reset voltage and a pixel voltage from the plurality of pixels PX and may generate a pixel signal.

In the present embodiment, at least one of the plurality of pixels PX may include a plurality of photodiodes disposed on the same level. The pixel signals generated from electric charges of the plurality of photodiodes may have phase differences. The control logic LC may provide an autofocusing function on the basis of the phase differences of the pixel signals generated from the plurality of photodiodes included in a single pixel PX.

The third layer 50 arranged in a lower portion of the second layer 40 may include a memory chip MC, a dummy chip DC, and a protective layer EN sealing the memory chip MC and the dummy chip DC. The memory chip MC may be a dynamic random access memory (DRAM) or a static random access memory (SRAM), and the dummy chip DC may not be used to store data. The memory chip MC may be electrically connected to at least portions of the devices included in the control logic LC on the second layer 40 by a bump, and may store information used to provide an autofocusing function. In the present embodiment, the bump may be a micro-bump.

Referring to FIG. 3, an imaging device 3 in the present embodiment may include a first layer 60 and a second layer 70. The first layer 60 may include a sensing area SA in which a plurality of pixels PX are arranged, a control logic area. LC in which devices for driving a plurality of pixels PX are arranged, and a first pad area PA1 arranged around the sensing area SA and the control logic area LC. The first pad area PA1 may include a plurality of upper pads PAD, and the plurality of upper pads PAD may be connected to a memory chip MC arranged on the second layer 70 through a via VIA. The second layer 70 may include the memory chip MC, a dummy chip DC, and a protective layer EN sealing the memory chip MC and the dummy chip DC.

Figure 4:
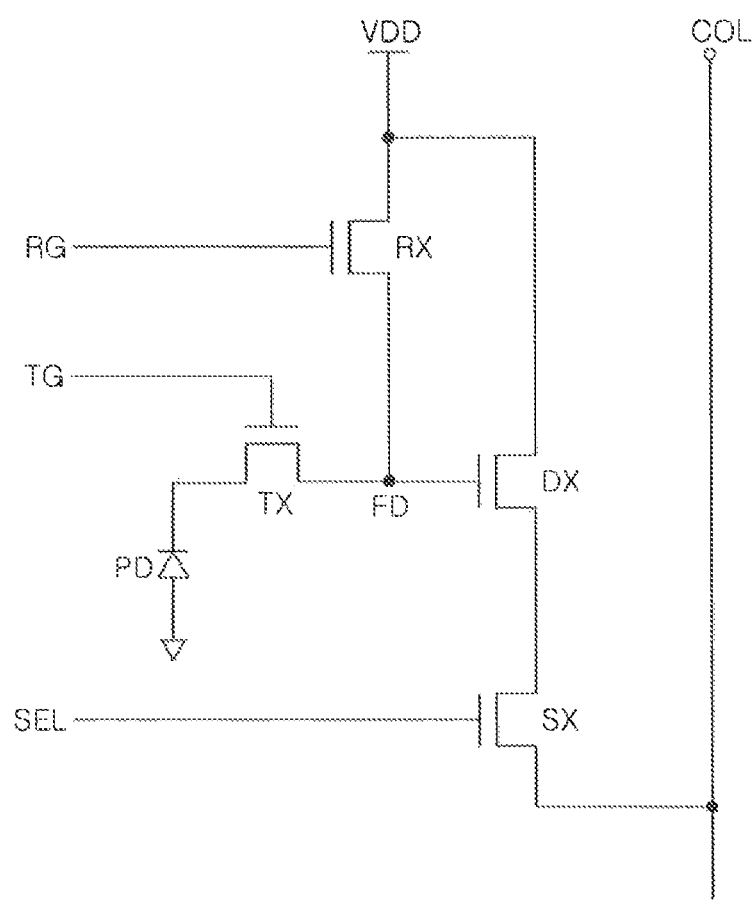
FIG. 4 is a schematic circuit diagram illustrating a pixel included in an image sensor according to an exemplary embodiment of the present inventive concept.

FIG. 4 is a schematic circuit diagram illustrating a pixel included in an image sensor according to an exemplary embodiment of the present inventive concept.

Referring to FIG. 4, a pixel included in an image sensor may include a photodiode PD for reacting to light and generating an electric charge, a pixel circuit for processing an electric charge generated by the photodiode PD and outputting an electric signal, and the like. As an example, the pixel circuit may include a reset transistor RX, a drive transistor DX, a select transistor SX, a transfer transistor TX, and the like.

The reset transistor RX may be turned on and turned off by a reset control signal RG, and when the reset transistor RX is turned on, a voltage of a floating diffusion FD may be reset to a power voltage VDD. When a voltage of the floating diffusion FD is reset, the select transistor SX may be turned on by a select control signal SEL, and a reset voltage may be output to a column line COL.

In exemplary embodiments of the present inventive concept, the photodiode PD may react to light and may generate electrons or holes as a major electric charge carrier. When the transfer transistor TX is turned on after a reset voltage is output to the column line COL, electrons generated by the photodiode PD exposed to light may move to the floating diffusion FD. The drive transistor DX may operate as a source-follower amplifier for amplifying a voltage of the floating diffusion FD, and when the select transistor SX is turned on by the select control signal SEL, a pixel voltage corresponding to the electrons generated by the photodiode PD may be output to the column line COL.

The reset voltage and the pixel voltage may be detected by a sampling circuit connected to the column line COL. The sampling circuit may include a plurality of samplers, each having a first input terminal and a second input terminal, and the sampler may receive a ramp voltage input via the first input terminal. The sampler may compare a ramp voltage input to the first input terminal with a reset voltage and a pixel voltage input to the second input terminal. An ADC may be connected to an output terminal of the sampler. The ADC may output reset data corresponding to the result of the comparison between the ramp voltage and the reset voltage, and pixel data corresponding to the result of the comparison between the ramp voltage and the pixel voltage. The control logic 24 may generate image data using a difference between the reset data and the pixel data.

Figure 5:
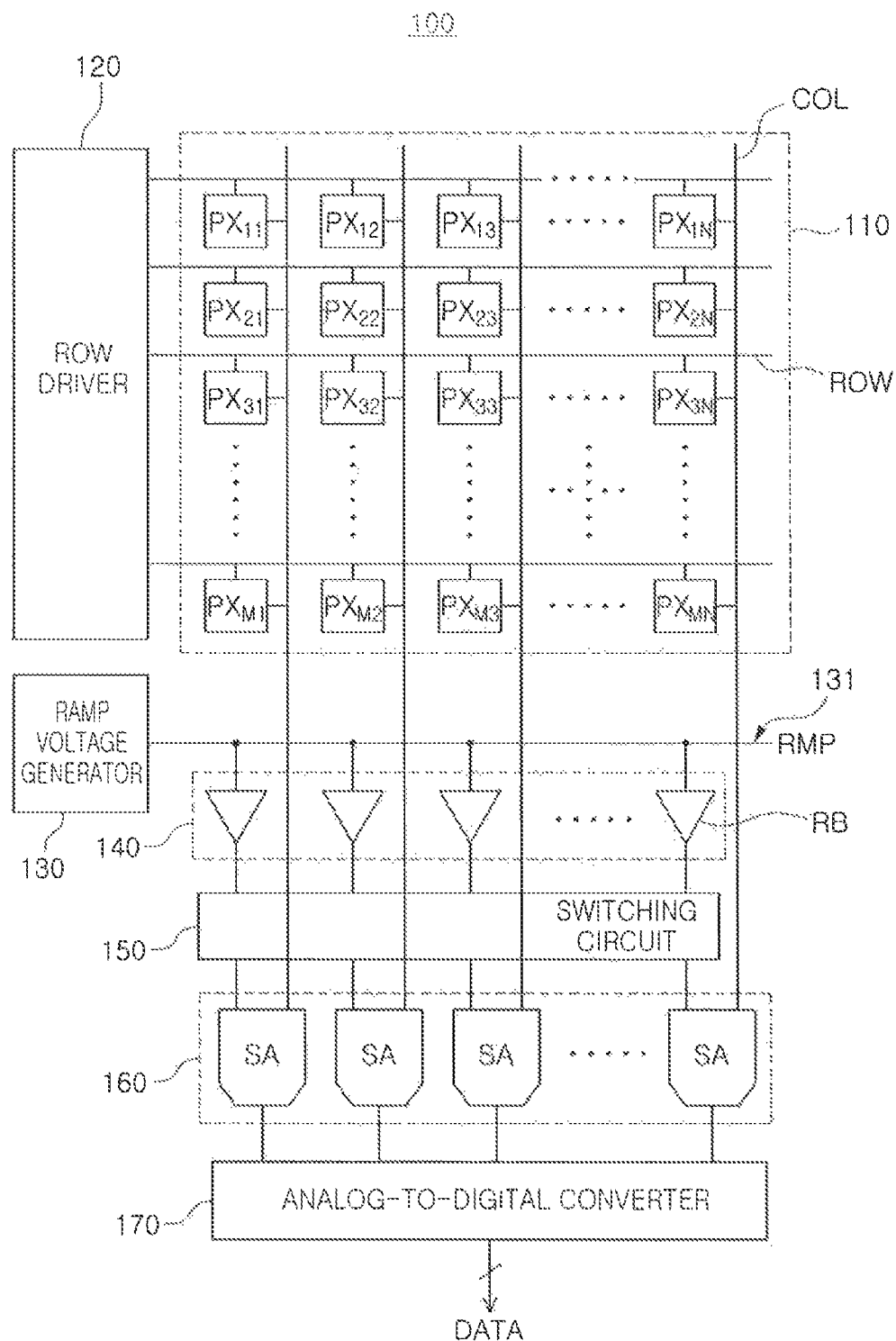
FIGS. 5 and 6 are diagrams illustrating operations of an image sensor according to an exemplary embodiment of the present inventive concept.
Figure 6:
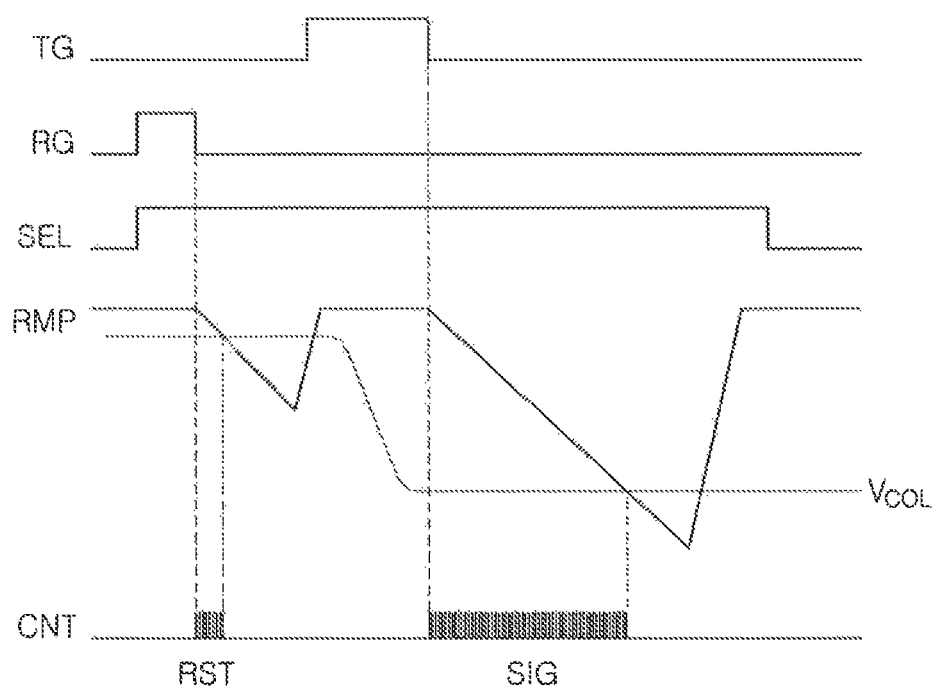

FIGS. 5 and 6 are diagrams illustrating operations of an image sensor according to an exemplary embodiment of the present inventive concept. FIG. 5 is a schematic block diagram illustrating an image sensor according to an exemplary embodiment of the present inventive concept, and FIG. 6 is a timing diagram illustrating operations of an image sensor according to an exemplary embodiment of the present inventive concept.

Referring to FIG. 5, an image sensor 100 in the present embodiment may include a pixel array 110, and a controller for driving the pixel array 110. The controller may include a row driver 120, a ramp voltage generator 130, a buffer circuit 140, a switching circuit 150, a sampling circuit 160, an ADC 170, and the like.

The pixel array 110 may include a plurality of pixels PX11 to PXMN arranged at intersecting points of a plurality of row lines ROW and a plurality of column lines COL. In exemplary embodiments of the present inventive concept, the plurality of pixels PX11 to PXMN may include a pixel circuit as illustrated in FIG. 4. The row driver 120 may input a signal for controlling the plurality of pixels PX11 to PXMN through a plurality of row lines ROW. As an example, a signal input to the plurality of pixels PX11 to PXMN through the plurality of row lines ROW may include a reset control signal RG, a transfer control signal TG, a select control signal SEL, and the like. The row driver 120 may sequentially select the plurality of row lines ROW. The row driver 120 may select one of the plurality of row lines ROW during a horizontal period.

The sampling circuit 160 may obtain a reset voltage and a pixel voltage from portions of pixels connected to a row line scanned by the row driver 120 among the plurality of pixels PX11 to PXMN. The sampling circuit 160 may include a plurality of samplers SA, and the plurality of samplers SA may be correlated double samplers. Each of the samplers SA may receive a ramp voltage generated by the ramp voltage generator 130 via a first input terminal, and may receive a reset voltage and a pixel voltage via a second input terminal.

Referring to FIG. 6, a reset transistor may be turned on by a reset control signal RG, and voltage of a floating diffusion included in a pixel may be reset. When a select transistor is turned on by a select control signal SEL, the ADC 170 may count the time in which a ramp voltage RMP is greater than a voltage VCOL output through a column line COL. Reset data RST corresponding to the reset voltage may be obtained using the time. For example, the reset data RST may correspond to a time in which the ramp voltage RMP is greater than the voltage VCOL output through the column line COL immediately after the reset control signal RG transitions from high to low.

A transfer transistor may be turned on by a transfer control signal TG after the reset data RST is obtained, and an electric charge generated by a photodiode of a pixel may move to a floating diffusion. Accordingly, the voltage VCOL output through the column line COL may decrease. The ADC 170 may count the time in which a ramp voltage RMP is greater than the voltage VCOL output through a column line COL after the transfer transistor is turned off, thereby obtaining pixel data SIG corresponding to a pixel voltage. The transfer transistor may be turned off by the transfer control signal TG transitioning from high to low. The control logic 24 may generate image data using a difference between the reset data RST and the pixel data SIG.

FIG. 6 illustrates an example in which the ramp voltage RMP may have a tendency to decrease over time. However, the ramp voltage RMP may also have a tendency to increase over time. When the ramp voltage RMP increases over time, the ADC 170 may count the time in which the voltage VCOL output through the column line COL is greater than the ramp voltage RMP, and may generate the reset data RST and the pixel data SIG.

Referring back to FIG. 5, the ramp voltage generator 130 may output a ramp voltage to a common ramp voltage path 131, and a plurality of ramp buffers RB may be connected to each other in parallel on the common ramp voltage path 131. The switching circuit 150 may be connected between output terminals of the plurality of ramp buffers RB and first input terminals of the samplers SA. The switching circuit 150 may selectively connect the first input terminals of the samplers SA to each other or disconnect the first input terminals of the samplers SA from each other.

The switching circuit 150 may connect the first input terminals of the samplers SA to each other or may disconnect the first input terminals of the samplers SA from each other in accordance with an operational mode of the image sensor 100, noise properties included in image data generated by the image sensor 100, and the like. As an example, in a first mode in which strength of light introduced into the pixel array 110 is relatively high, the switching circuit 150 may disconnect at least portions of the first input terminals of the samplers SA from each other. In a second mode in which strength of light introduced into the pixel array 110 is relatively low, the switching circuit 150 may connect the first input terminals of the samplers SA to each other.

The first mode and the second mode may also correspond to gains applied while the image sensor 100 processes a voltage obtained from the plurality of pixels PX11 to PXMN into a signal. As an example, in the first mode in which the image sensor 100 applies a relatively small gain during the signal-processing, at least portions of the first input terminals of the samplers SA may be disconnected from each other by the switching circuit 150. In the second mode in which the image sensor 100 applies a relatively large gain during the signal-processing, the first input terminals of the samplers SA may be connected to each other by the switching circuit 150. The first mode and the second mode may be determined by comparing a gain that the image sensor 100 applies during the signal-processing with a certain threshold value.

In exemplary embodiments of the present inventive concept, when it is determined that it is highly likely that band noise may occur in a direction in which the plurality of row lines ROW extend, the switching circuit 150 may disconnect portions of the first input terminals of the samplers SA from each other. When it is determined that it is highly likely that temporal noise may occur, the switching circuit 150 may connect the first input terminals of the samplers SA to each other. When the first input terminals of the samplers SA are connected to each other, temporal noise properties included in an output of each of the plurality of ramp buffers RB may decrease by averaging noise.

In exemplary embodiments of the present inventive concept, the switching circuit 150 may selectively connect or disconnect the first input terminals of the samplers SA depending on types of the pixels PX11 to PXMN connected to the second input terminals of the samplers SA. As an example, the switching circuit 150 may connect the first input terminals of the samplers SA connected to the same type of pixels to each other, and may disconnect the first input terminals of the samplers SA connected to different types of pixels from each other. For example, types of the pixels may be determined in accordance with color filters included in the pixels. The switching circuit 150 may connect the first input terminals of the first samplers SA connected to pixels having red color filters to each other, may connect the first input terminals of the second samplers SA connected to pixels having blue color filters to each other, and may connect the first input terminals of the third samplers SA connected to pixels having green color filters to each other, during a single horizontal period. During a single horizontal period, the first input terminals of the first samplers SA, the first input terminals of the second samplers SA, and the first input terminals of the third samplers SA may be disconnected from each other by the switching circuit 150.

In exemplary embodiments of the present inventive concept, the switching circuit 150 may selectively connect the first input terminals of the samplers SA to each other or disconnect the first input terminals of the samplers SA from each other based on noise properties, an operational mode of the image sensor 100, a pixel arrangement structure of the pixel array 110, and the like. The control logic of the image sensor 100 may improve noise properties, linearity, and the like, of the image sensor 100 and may optimize the performance of the image sensor 100 by connecting or disconnecting the first input terminals of the samplers SA using the switching circuit 150. In addition, in exemplary embodiments of the present inventive concept, power consumption and a circuit area of the image sensor 100 may decrease, as compared to a method of increasing bias currents of the ramp buffers RB or changing a size of a device connected to the first input terminals to reduce noise occurring in outputs of the ramp buffers RB.

FIGS. 7, 8, 9A, 9B and 10 are diagrams illustrating operations of an image sensor according to an exemplary embodiment of the present inventive concept.

Figure 7:
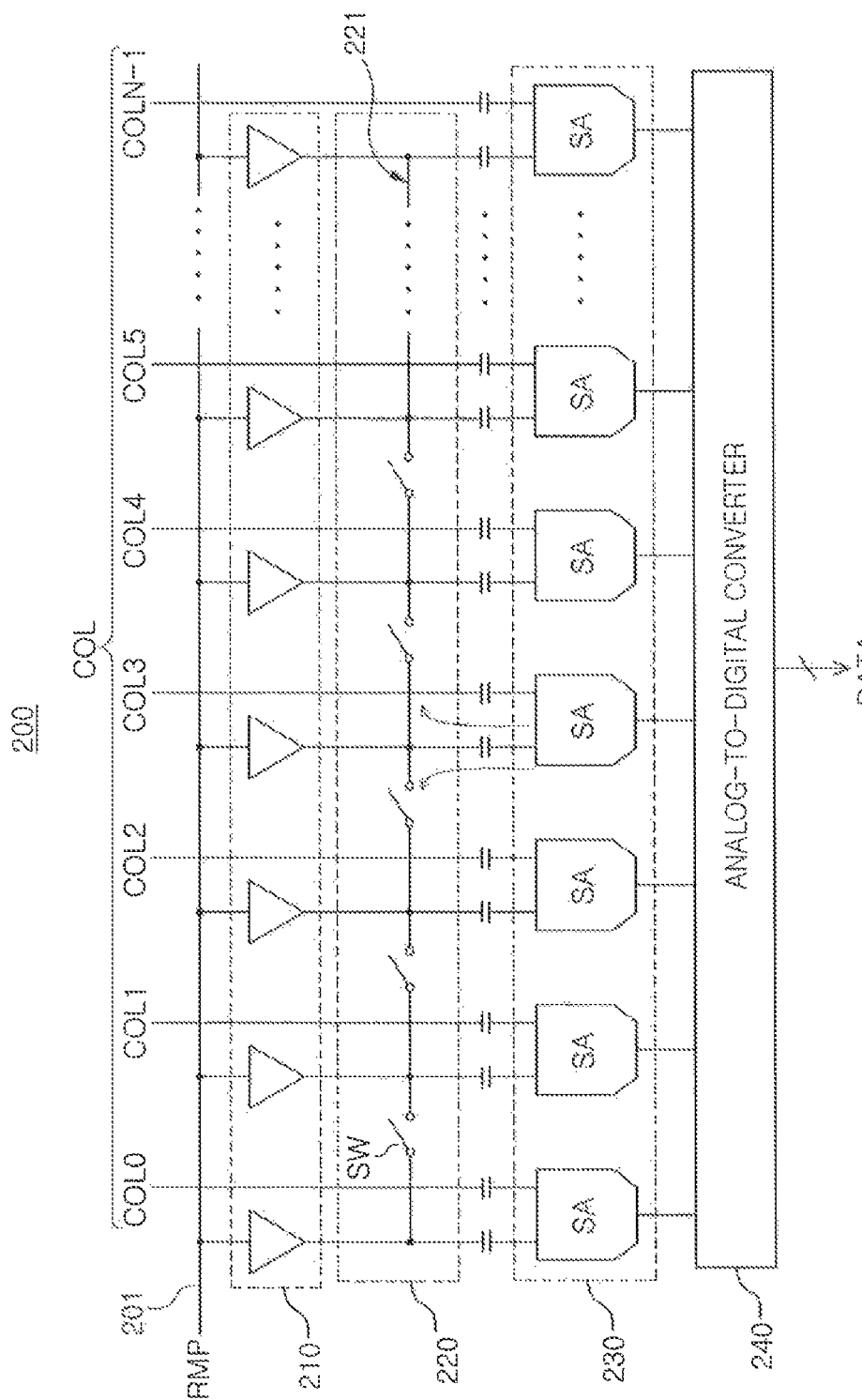
FIGS. 7, 8, 9A, 9B and 10 are diagrams illustrating operations of an image sensor according to an exemplary embodiment of the present inventive concept.
Figure 8:
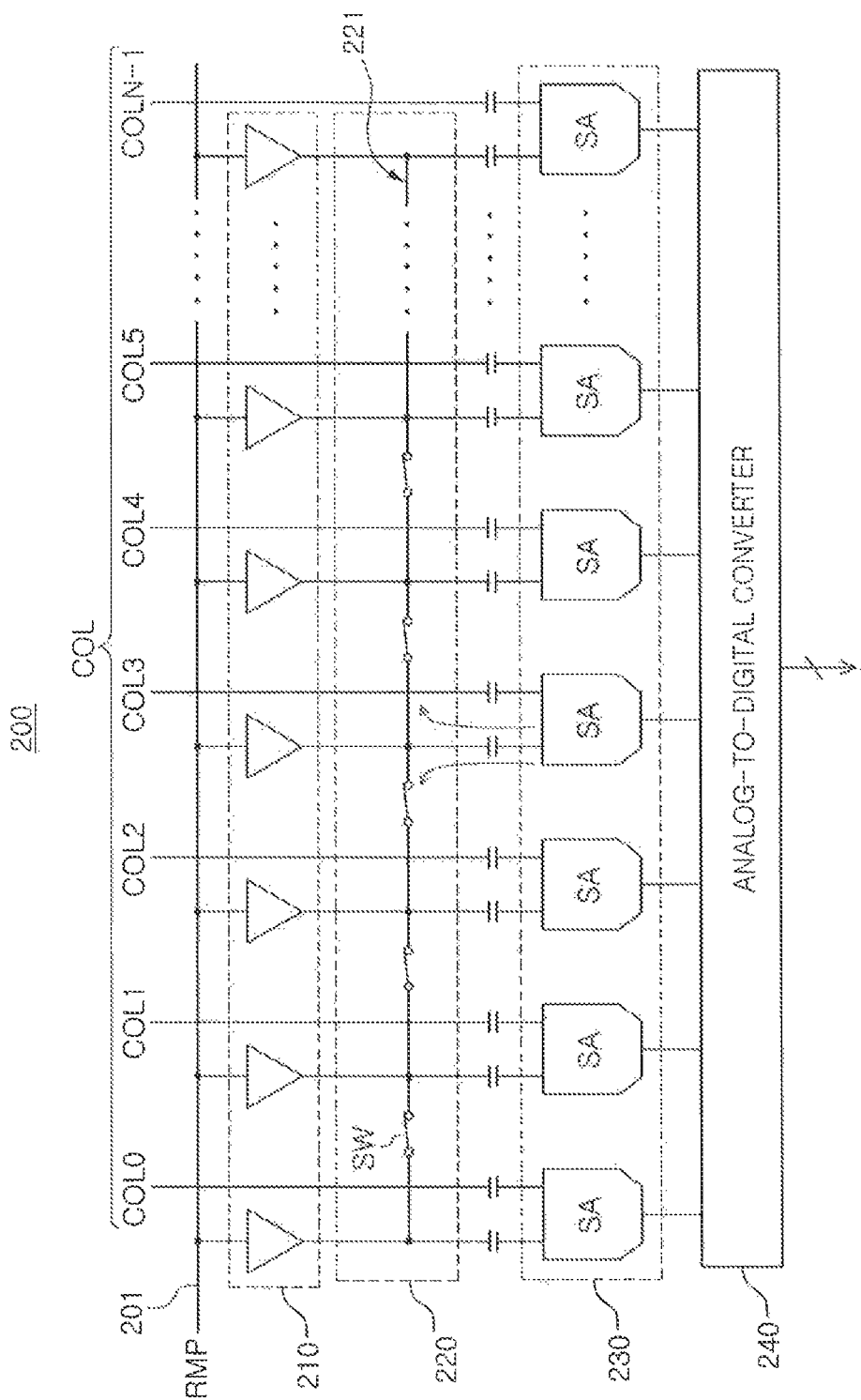

Referring to FIGS. 7 and 8, an image sensor 200 in the present embodiment may include a common ramp voltage path 201, a buffer circuit 210, a switching circuit 220, a sampling circuit 230, an ADC 240, and the like. The common ramp voltage path 201 may be a path through which a ramp voltage generator outputs a ramp voltage RMP. The sampling circuit 230 may include a plurality of samplers SA, and each of the samplers SA may include a first input terminal connected to the common ramp voltage path 201 and for receiving the ramp voltage RMP, and a second input terminal connected to a plurality of column lines COL0 to COLN—1 (COL). A capacitor may be connected to the first input terminal and the second input terminal of each of the samplers SA. Each of the samplers SA in the present embodiment may further include an auto-zero switch connected between the first input terminal and an output terminal and between the second input terminal and the output terminal.

The first input terminal of each of the samplers SA may receive a ramp voltage RMP from the common ramp voltage path 201 through a ramp buffer RB. Ira addition, the first input terminals of the samplers SA may be connected to ramp voltage paths 221, and switching devices SW may be connected between the ramp voltage paths 221. As illustrated in the examples in FIGS. 7 and 8, the ramp voltage paths 221 may be connected to each other or disconnected from each other as the switching devices SW are turned off or turned on. When the switching devices SW are turned on, the ramp voltage paths 221 may be connected to each other as a single path such that the first input terminals of the samplers SA may be connected to each other. When the switching devices SW are turned off, the ramp voltage paths 221 may be disconnected from each other such that the first input terminals of the samplers SA may be disconnected from each other.

The switching devices SW may be turned on or turned off on the basis of various parameters such as an operational mode of the image sensor 200, operational conditions of the image sensor 200, noise properties occurring in image data generated by the image sensor 200, a pixel arrangement structure of a pixel array, a register value stored in the image sensor 200, and the like. As an example, when it is assumed that band noise may increase, a control logic of the image sensor 200 may turn off the switching devices SW. When the switching devices SW are turned off, the ramp voltage paths 221 may be disconnected from each other, and the samplers SA may be connected to different ramp voltage paths 221. Accordingly, noise occurring during an operation in at least one of the samplers SA may not be transferred to the other samplers SA through the ramp voltage paths 221.

When it is assumed that temporal noise may increase, the control logic of the image sensor 200 may turn on the switching devices SW. When the switching devices SW are turned on, the ramp voltage paths 221 may be connected to each other as a single path, and the samplers SA may share the ramp voltage paths 221 connected to each other as a single path. As the ramp voltage paths 221 are connected to each other as a single path, noise elements may reduce by averaging the noise. This noise reduction may be significant. The method employed by the control logic of the image sensor 200 for controlling the switching circuit 220 may be adjusted in various manners through a separately distributed firmware even after the image sensor 200 is mounted on an electronic device, and the like, and is sold to an end-user.

Figure 9A:
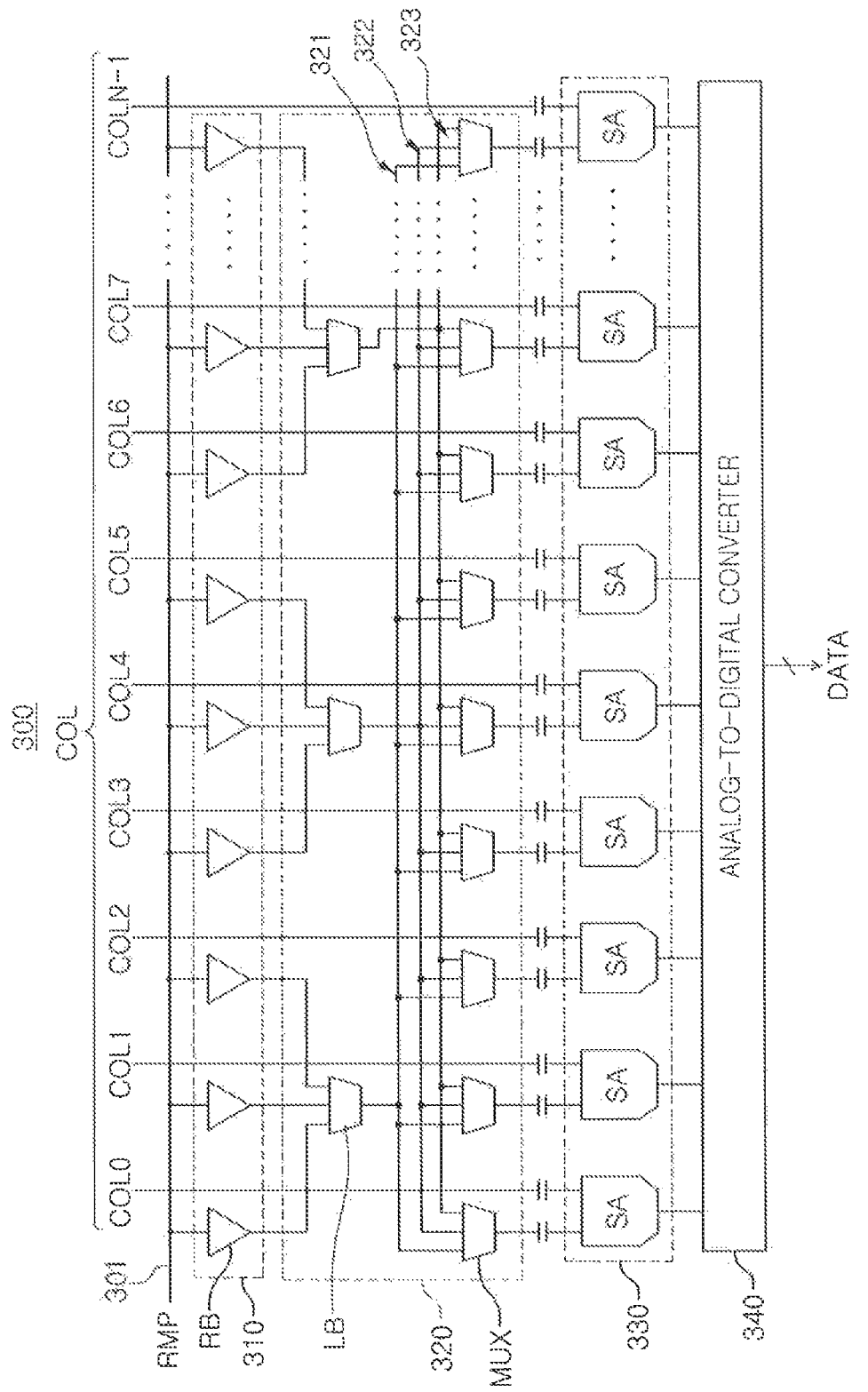

Referring to FIG. 9A, an image sensor 300 in the exemplary embodiment may include a common ramp voltage path 301, a buffer circuit 310, a switching circuit 320, a sampling circuit 330, an ADC 340, and the like. The common ramp voltage path 301 may supply a ramp voltage RMP generated and output by a ramp voltage generator. The sampling circuit 330 may include a plurality of samplers SA, and each of the samplers SA may include a first input terminal for receiving the ramp voltage RMP, and a second input terminal connected to one of a plurality of column lines COL0 to COLN—1 (COL).

The buffer circuit 310 may include a plurality of ramp buffers RB, and the plurality of ramp buffers RB may be connected to the common ramp voltage path 301. An output terminal of the common ramp voltage path 301 may be connected to one of a plurality of ramp voltage paths 321, 322 and 323 included in the switching circuit 320. Each of the plurality of ramp voltage paths 321 to 323 may be connected to output terminals of two or more ramp buffers RB.

As an example, as illustrated in FIG. 9A, line buffers LB may be connected between the plurality of ramp voltage paths 321 to 323 and the plurality of ramp buffers RB. Each of the line buffers LB may have input terminals connected to two or more ramp buffers RB, and a single output terminal. The output terminal of each of the line buffers LB may be connected to one of the plurality of ramp voltage paths 321 to 323.

Figure 9B:
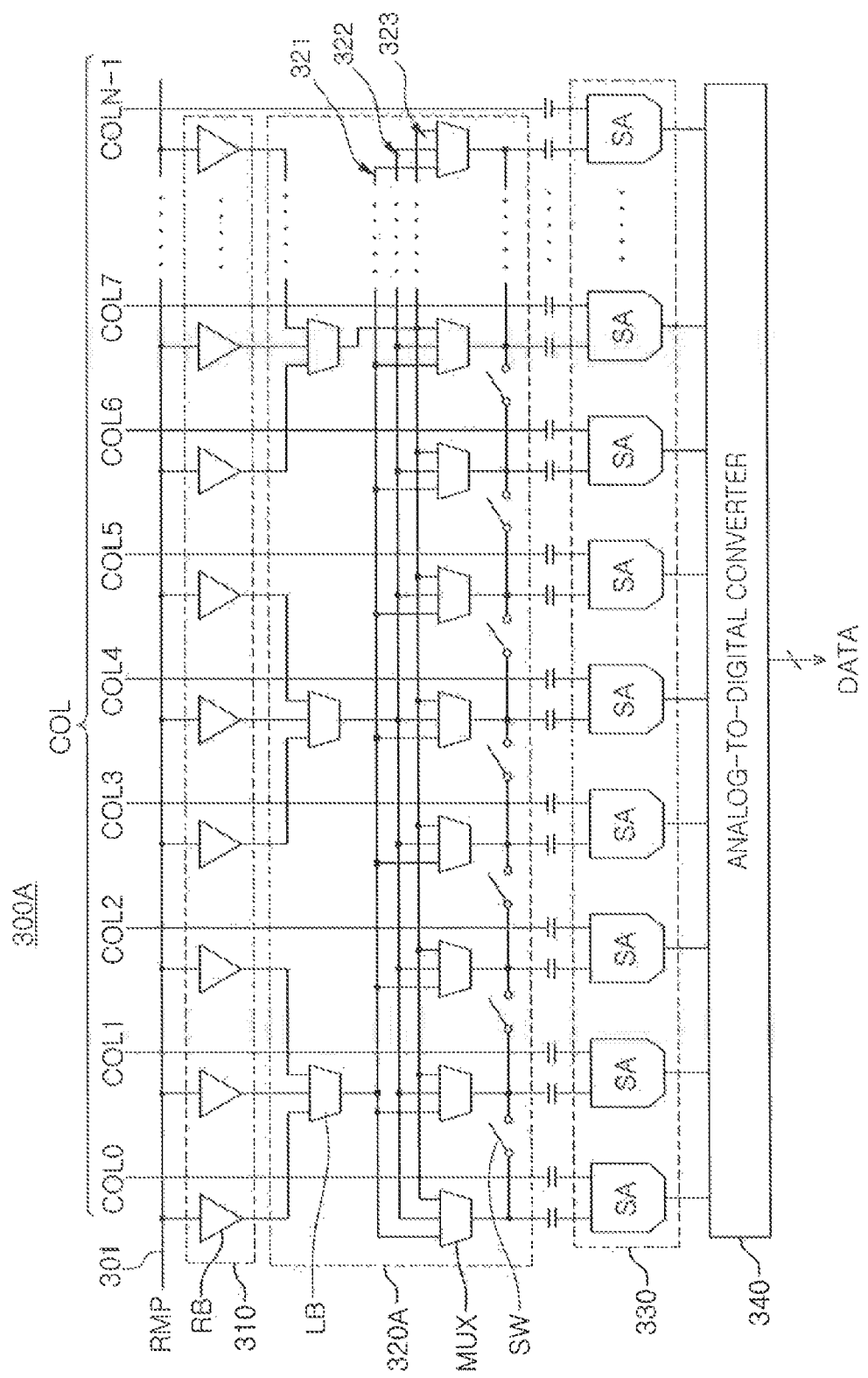

An image sensor 300A in the exemplary embodiment illustrated in FIG. 9B may include a common ramp voltage path 301, a buffer circuit 310, a sampling circuit 330, an ADC 340, and the like, similarly to the embodiment illustrated in FIG. 9A. In the image sensor 300A in the embodiment illustrated in FIG. 9B, a switching circuit 320A may further include a switch SW for selectively connecting first input terminals of samplers SA.

Figure 10:
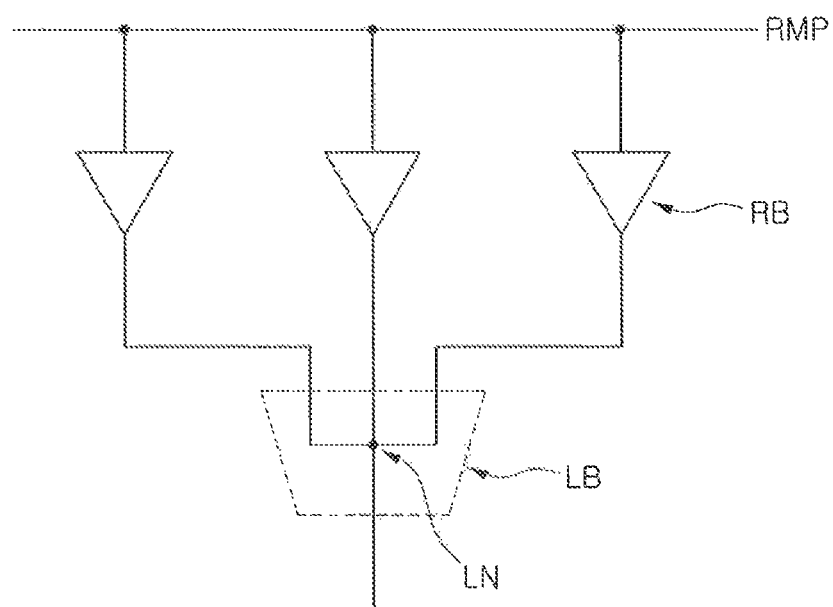

Referring to FIG. 10, output terminals of two or more ramp buffers RB may be connected to a single node LN within a line buffer LB. A voltage of the node EN may be substantially the same as a ramp voltage RMP buffered and output by ramp buffers RB. In addition, in the node LN, output currents of two or more ramp buffers RB may be combined with each other.

Referring back to FIGS. 9A and 9B, the switching circuits 320 and 320A may include a plurality of multiplexers MUX connected between the plurality of ramp voltage paths 321 to 323 and the first input terminals of the samplers SA. The plurality of multiplexers MUX may connect one of the plurality of ramp voltage paths 321 to 323 to the first input terminals of the samplers SA in response to a control command transferred from the control logic of the image sensors 300 and 300A.

The control logic of the image sensor 300 may control the plurality of multiplexers MUX in consideration of an operational mode of the image sensor 300, operational conditions of the image sensor 300, noise properties occurring in image data, a pixel arrangement structure of a pixel array, a register value stored in advance, and the like. As an example, in an operational mode or an operational condition in which it is highly likely that temporal noise may increase, the control logic of the image sensor 300 may control the multiplexers MUX to select one of the plurality of ramp voltage paths 321 to 323. In exemplary embodiments of the present inventive concept, the control logic of the image sensors 300 and 300A may connect output terminals of all the multiplexers MUX to one of the plurality of ramp voltage paths 321 to 323 in an operational condition in which it is assumed that band noise may decrease, and thus, may decrease noise occurring along column lines COL. In addition, in the embodiment illustrated in FIG. 9B, the control logic of the image sensor 300A may control the switch SW along with the plurality of multiplexers MUX such that a connection relationship between the first input terminals of the samplers SA and the plurality of ramp voltage paths 321 to 323 may be determined in various manners.

In exemplary embodiments of the present inventive concept, the control logic of the image sensors 300 and 300A may connect the first input terminals of the samplers SA to obtain a reset voltage and a pixel voltage from pixels having color filters of the same color to one of the plurality of ramp voltage paths 321 to 323. As an example, the control logic of the image sensors 300 and 300A may connect the first input terminals of the samplers SA connected to pixels having red color filters to the first ramp voltage path 321, and may connect the first input terminals of the samplers SA connected to pixels having green color filters to the second ramp voltage path 322. The control logic of the image sensors 300 and 300A may also connect the first input terminals of the samplers SA connected to pixels having blue color filters to the third ramp voltage path 323. In exemplary embodiments of the present inventive concept, the first input terminals of the samplers SA connected to the pixels having green color filters may also be connected to different ramp voltage paths 321 to 323.

In exemplary embodiments of the present inventive concept, line buffers LB grouping output terminals of two or more adjacent ramp buffers RB may be omitted. In a case in which the line buffers LB are omitted, each of output terminals of the ramp buffer RB may be directly connected to one of the ramp voltage paths 321 to 323.

FIG. 11 is a schematic diagram illustrating a pixel array included in an image sensor according to an exemplary embodiment of the present inventive concept.

Referring to FIG. 11, a pixel array PA1 in the present embodiment may include a plurality of pixels connected to a plurality of row lines ROW0 to ROWM−1 (ROW) and a plurality of column lines COL0 to COLN−1 (COL). Each of the plurality of pixels may include a color filter of a certain color. A photodiode of each of the plurality of pixels may react to a color of light passing through a color filter and may generate an electric charge.

In a pixel array PA1 in the embodiment illustrated in FIG. 11, the plurality of pixels may include first pixels R having red color filters, second pixels Gr having green color filters and disposed between the first pixels R in a row direction, third pixels Gb having green color filters and disposed between the first pixels R in a column direction, and fourth pixels B having blue color filters. The first to fourth pixels R, Gr, Gb, and B may be alternately arranged. An arrangement structure of the first to fourth pixels R, Gr, Gb, and B may not be limited to the embodiment illustrated in FIG. 11, and may vary.

In the description below, operations of an image sensor will be described with reference to FIGS. 12 to 14 along with FIG. 11.

Figure 12:
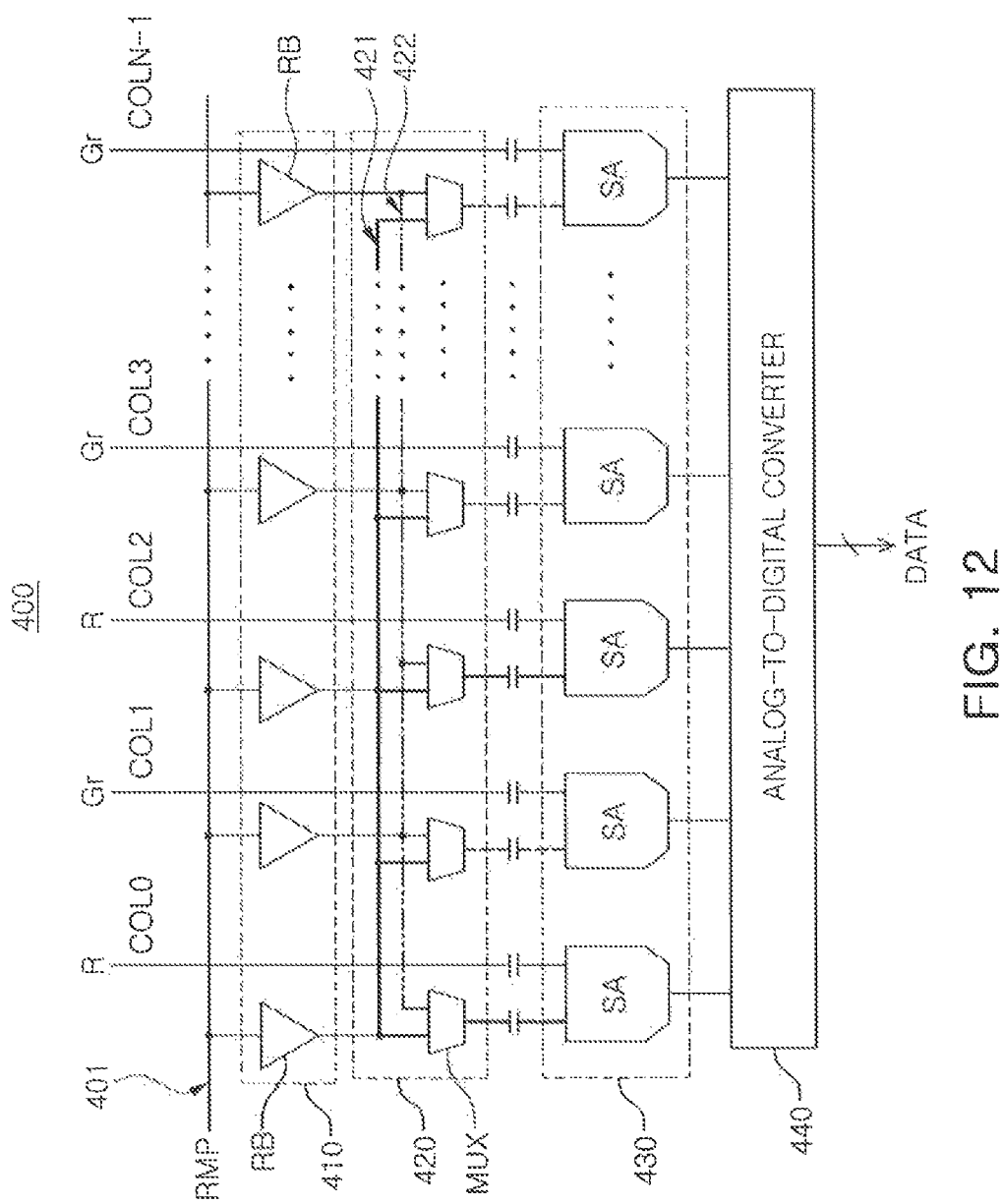
FIGS. 12, 13 and 14 are diagrams illustrating operations of an image sensor according to an exemplary embodiment of the present inventive concept.
Figure 13:
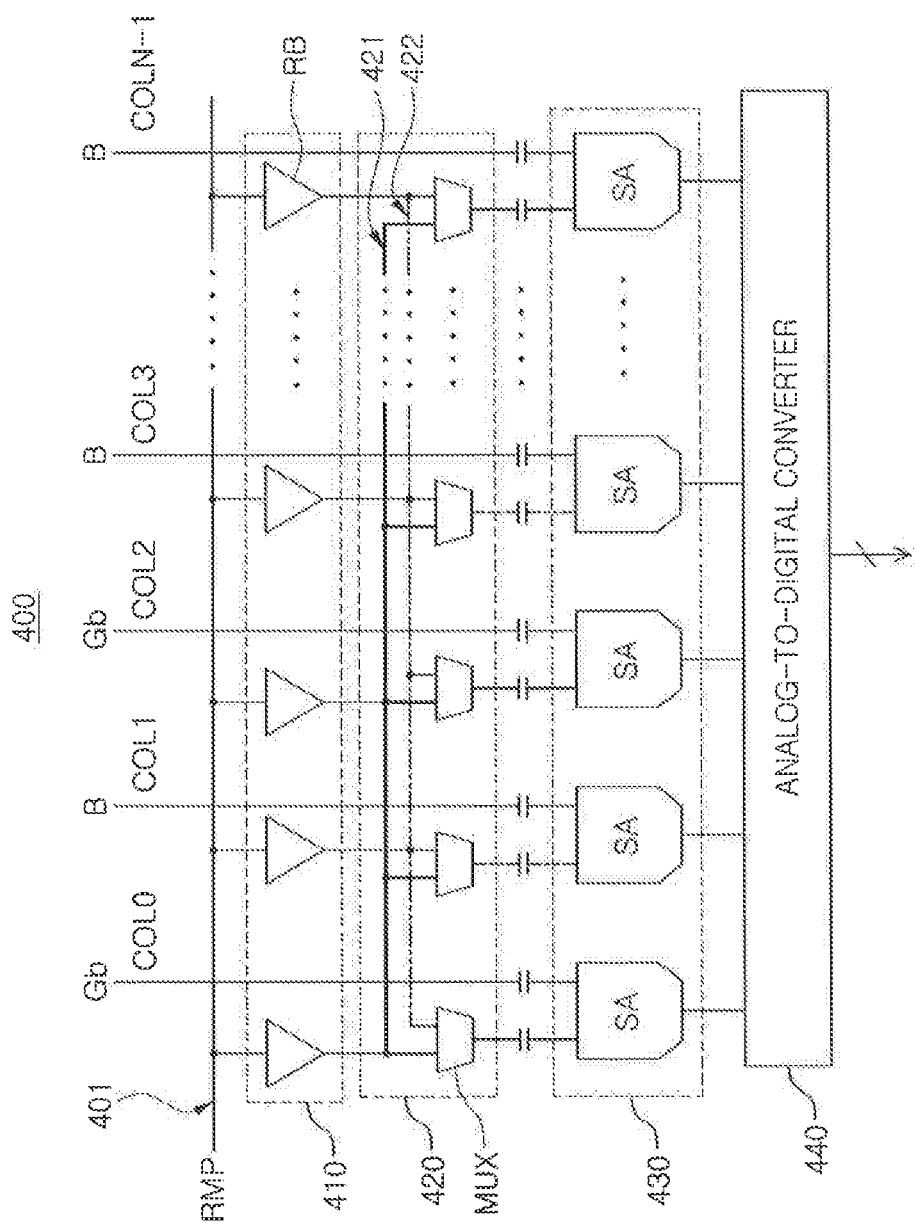
Figure 14:
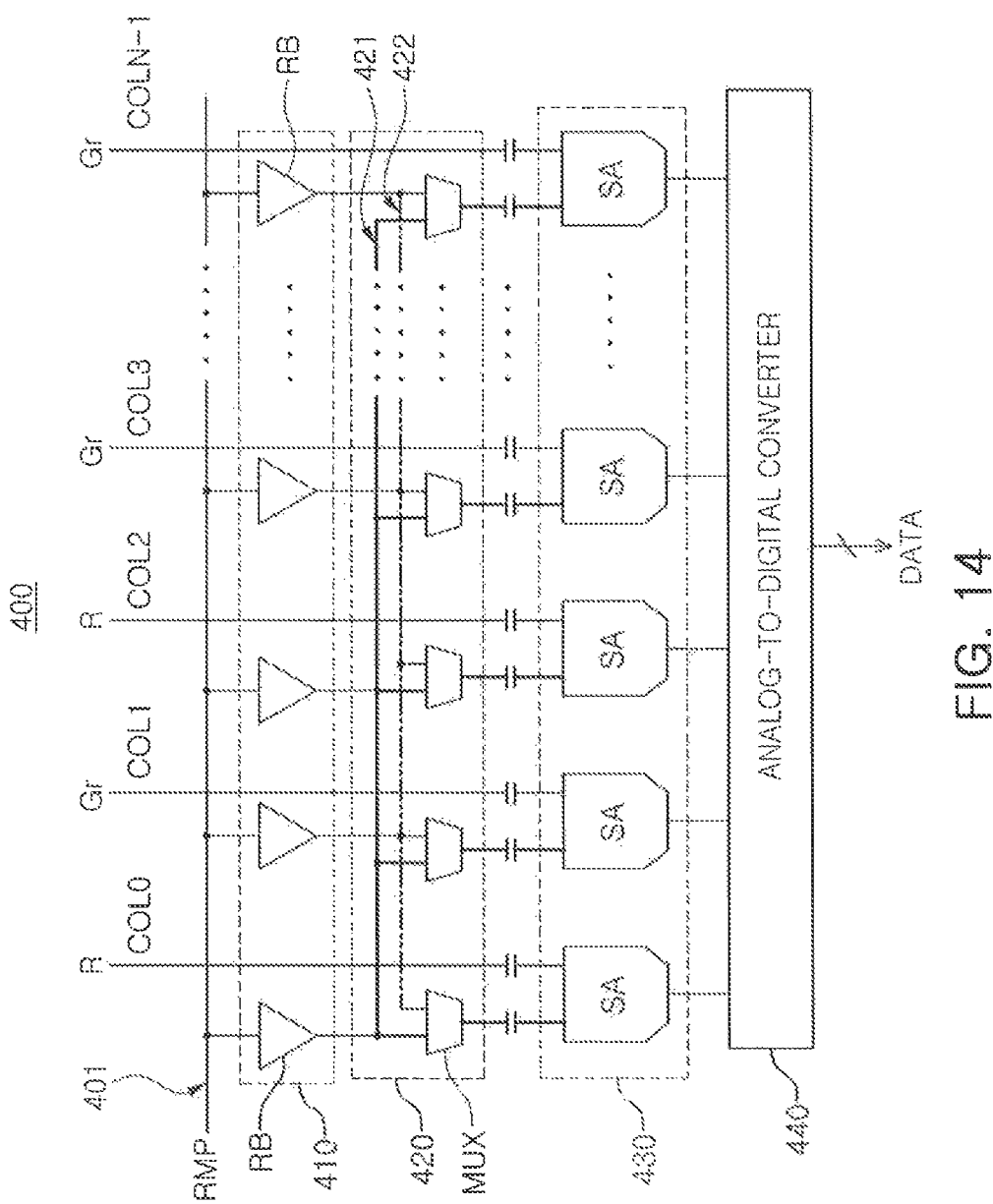

FIGS. 12 to 14 are diagrams illustrating operations of an image sensor according to an exemplary embodiment of the present inventive concept. FIGS. 12 to 14 may be diagrams illustrating operations of a readout circuit included in an image sensor according to an exemplary embodiment of the present inventive concept.

Referring to FIGS. 12 to 14, an image sensor 400 may include a common ramp voltage path 401 for supplying a ramp voltage RMP, a buffer circuit 410, a switching circuit 420, a sampling circuit 430, an ADC 440, and the like. The buffer circuit 410 may include a plurality of ramp buffers RB connected to the common ramp voltage path 401 in parallel, and the sampling circuit 430 may include a plurality of samplers SA. The switching circuit 420 may be connected between the ramp buffers RB and the samplers SA. Each of the samplers SA may include a first input terminal for receiving a ramp voltage and a second input terminal connected to one of the column lines COL0 to COLN−1 (COL). As an example, a capacitor may be connected to the first input terminal and the second input terminal of each of the samplers SA.

The switching circuit 420 may include a plurality of ramp voltage paths 421 and 422 and a plurality of multiplexers MUX. The plurality of multiplexers MUX may select one of the first ramp voltage path 421 and the second ramp voltage path 422 and may connect the selected ramp voltage path to the first input terminals of the samplers SA.

FIG. 12 is a diagram illustrating operations of the image sensor 400 during a first time period in which a first row line ROW0 of a pixel array PA1 is selected. Referring to FIG. 12, during the first time period in which the first row line ROW0 is selected, first pixels R and second pixels Gr connected to the first row line ROW0 may be connected to the second input terminals of the samplers SA, through the column lines COL. Each of the samplers SA may compare a voltage output through the column lines COL by the first pixels R or the second pixels Gr with a ramp voltage RMP. The ADC 440 may count the outputs of the samplers SA as clock signals and may generate data DATA corresponding to the first pixels R and the second pixels Gr.

The multiplexers MUX connected to the second input terminals of the samplers SA receiving a voltage from the first pixels R may select a first ramp voltage path 421 during the first time period. The multiplexers MUX connected to the second input terminals of the samplers SA receiving a voltage from the second pixels Gr may select the second ramp voltage path 422 during the first time period. Since the samplers SA connected to the same type of the first pixels R receive a ramp voltage through a single path, and the samplers SA connected to the same type of the second pixels Gr receive a ramp voltage through a single path, linearity of the image sensor 400 may improve.

FIG. 13 is a diagram illustrating operations of the image sensor 400 during a second time period in which a second row line ROW1 of the pixel array PA1 is selected. Referring to FIG. 13, during the second time period in which the second row line ROW1 is selected, third pixels Gb and fourth pixels B connected to the second row line ROW1 may be connected to second input terminals of samplers SA through column lines COL. Each of the samplers SA may compare a voltage output through the column lines COL by the third pixels Gb or the fourth pixels B with a ramp voltage RMP. An ADC 440 may convert outputs of the samplers SA into data DATA in digital form and may output the data DATA.

The multiplexers MUX connected to the second input terminals of the samplers SA receiving a voltage from the third pixels Gb may select a first ramp voltage path 421 during the second time period. The multiplexers MUX connected to the second input terminals of the samplers SA connected to the fourth pixels B may select a second ramp voltage path 422 during the second time period. The multiplexers MUX may select the first ramp voltage path 421 and the second ramp voltage path 422 in a reverse manner, different from the example above. Since the samplers SA connected to the third pixels Gb receive a ramp voltage through a single path, and the samplers SA connected to the fourth pixels B receive a ramp voltage through a single path, linearity of the image sensor 400 may improve. In the embodiments illustrated in FIGS. 12 and 13, the multiplexers MUX may connect the first input terminal of each of the samplers SA to one of the ramp voltage paths 421 and 422 in the first time period and the second time period.

In the embodiments described with reference to FIGS. 12 and 13, the image sensor 400 may operate in a first mode. In a second mode different from the first mode, the multiplexers MUX may select one of the plurality of ramp voltage paths 421 and 422 in a different manner, and may connect the selected ramp voltage path to the first input terminals of the samplers SA. The configuration just described will be described in greater detail with reference to FIG. 14.

Referring to FIG. 14, multiplexers MUX may select a first ramp voltage path 421 and may connect the first ramp voltage path 421 to first input terminals of samplers SA in a second mode. Thus, the first input terminals of the samplers SA may receive a ramp voltage from the first ramp voltage path 421 in common. Alternatively, the multiplexers MUX may select the second ramp voltage path 422 and may connect the second ramp voltage path 422 to the first input terminals of the samplers SA in the second mode.

The first mode may be an operational mode in which a relatively large amount of light is incident to a pixel array PA1. The second mode may be an operational mode in which a relatively small amount of light is incident to the pixel array PA1. Alternatively, the first mode may be a mode in which a relatively high level of band noise occurs by operating the image sensor 400, and the second mode may be a mode in which a relatively high level of temporal noise occurs. The second mode may also refer to a mode in which the image sensor 400 operates with relatively low power consumption as compared to the first mode.

A readout circuit in the embodiments described with reference to FIGS. 12 and 14 may also be applied to pixel arrays having a structure different from a structure of the pixel array PA1 illustrated in FIG. 11. As an example, the readout circuit in the embodiments illustrated in FIGS. 12 to 14 may be applied to a pixel array having a structure in which portions of adjacent pixels share a single column line, a pixel array in which an arrangement of color filters of pixels is different from the embodiment illustrated in FIG. 11, a pixel array having a structure in which a single pixel includes a plurality of photodiodes, or the like, in various manners.

FIGS. 15 to 19 are diagrams illustrating operations of an image sensor according to an exemplary embodiment of the present inventive concept. FIGS. 15 to 19 are diagrams illustrating operations of a readout circuit included in an image sensor according to an exemplary embodiment of the present inventive concept. The readout circuit described with reference to FIGS. 15 to 19 may be connected to various structures of pixel arrays and may operate. In the description below, operations of an image sensor 500 will be described with reference to the diagrams along with the pixel array PA1 illustrated in FIG. 11.

Referring to FIGS. 15 to 19, an image sensor 500 may include a common ramp voltage path 501 for supplying a ramp voltage RMP, a buffer circuit 510, a switching circuit 520, a sampling circuit 530, an ADC 540, and the like. The buffer circuit 510 may include a plurality of ramp buffers RB connected to the common ramp voltage path 501 in parallel, and the sampling circuit 530 may include a plurality of samplers SA. The switching circuit 520 may be connected between the ramp buffers RB and the samplers SA. Each of the samplers SA may include a first input terminal for receiving a ramp voltage and a second input terminal connected to one of the column lines COL0 to COLN−1 (COL). A capacitor may be connected to the first input terminal and the second input terminal of each of the samplers SA.

The switching circuit 520 may include a plurality of ramp voltage paths 521, 522, 523 and 524, a plurality of line buffers LB, and a plurality of multiplexers MUX. The plurality of multiplexers MUX may select one of the plurality of ramp voltage paths 521 to 524 and may connect the selected ramp voltage path to the first input terminals of the samplers SA. The plurality of line buffers LB may group portions of output terminals of the plurality of ramp buffers RB as a single output terminal and perform an output operation. Referring to FIGS. 15 to 19, each of the output terminals of the plurality of ramp buffers RB may be connected to one of the first to fourth ramp voltage paths 521 to 524.

In the embodiment illustrated in FIGS. 15 to 19, the first to fourth ramp voltage paths 521 to 524 may be allocated as individual ramp voltage paths for first, second, third and fourth pixels R, Gr, Gb, and B. As an example, the first ramp voltage path 521 may be a ramp voltage path for the first pixels R, the second ramp voltage path 522 may be a ramp voltage path for second pixels Gr, the third ramp voltage path 523 may be a ramp voltage path for the third pixels Gb, and the fourth ramp voltage path 524 may be a ramp voltage path for the fourth pixels B.

Figure 15:
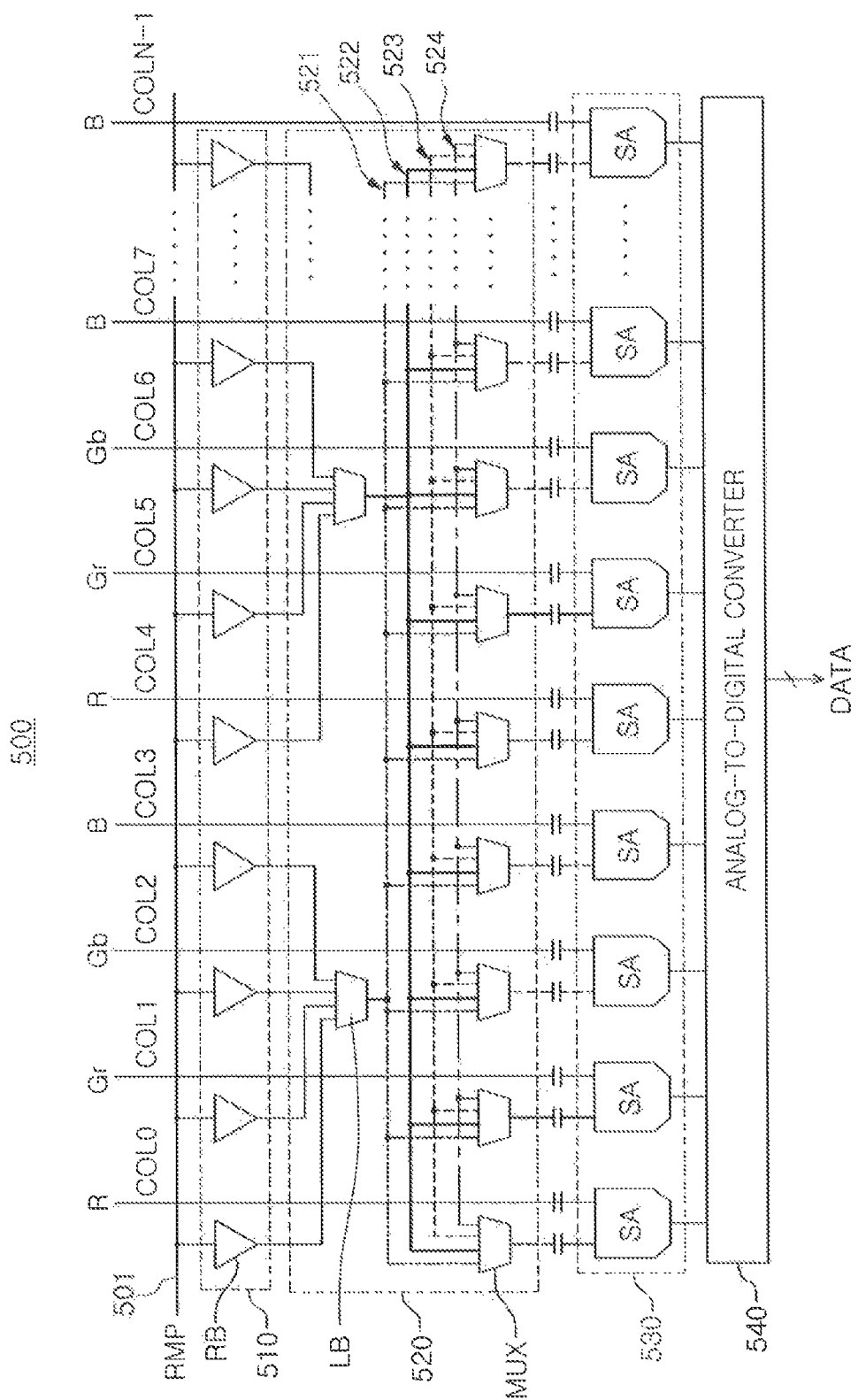
FIGS. 15, 16, 17, 18 and 19 are diagrams illustrating operations of an image sensor according to an exemplary embodiment of the present inventive concept.

FIG. 15 is a diagram illustrating operations of an image sensor 500 in a first time period in which a first row line ROW0 and a second row line ROW1 are selected. In the present embodiment, during the first time period, 5N-4th pixels and 5N-3th pixels may be selected from among pixels connected to the first row line ROW0, and 5N-2th pixels and 5N-1th pixels may be selected from among pixels connected to the second row line ROW1 (N is a natural number). Accordingly, as illustrated in FIG. 15, the first to fourth column lines COL0 to COL3 may be connected to the first to fourth pixels R, Gr, Gb, and B in order. Similarly, the fifth to eighth column lines COL4 to COL7 may be connected to the first to fourth pixels R, Gr, Gb, and B in order.

In the present embodiment, the first input terminals of the samplers SA having second input terminals connected to the first pixels R may be connected to the first ramp voltage path 521 by multiplexers MUX. The first input terminals of the samplers SA having second input terminals connected to the second pixels Gr may be connected to the second ramp voltage path 522 by the multiplexers MUX. The first input terminals of the samplers SA having second input terminals connected to the third pixels Gb may be connected to the third ramp voltage path 523 by the multiplexers MUX. The first input terminals of the samplers SA having second input terminals connected to the fourth pixels B may be connected to the fourth ramp voltage path 524 by the multiplexers MUX. An operational method of the multiplexers MUX may vary depending on a relationship between the first to fourth ramp voltage paths 521 to 524 and the first to fourth pixels R, Gr, Gb, and B.

Figure 16:
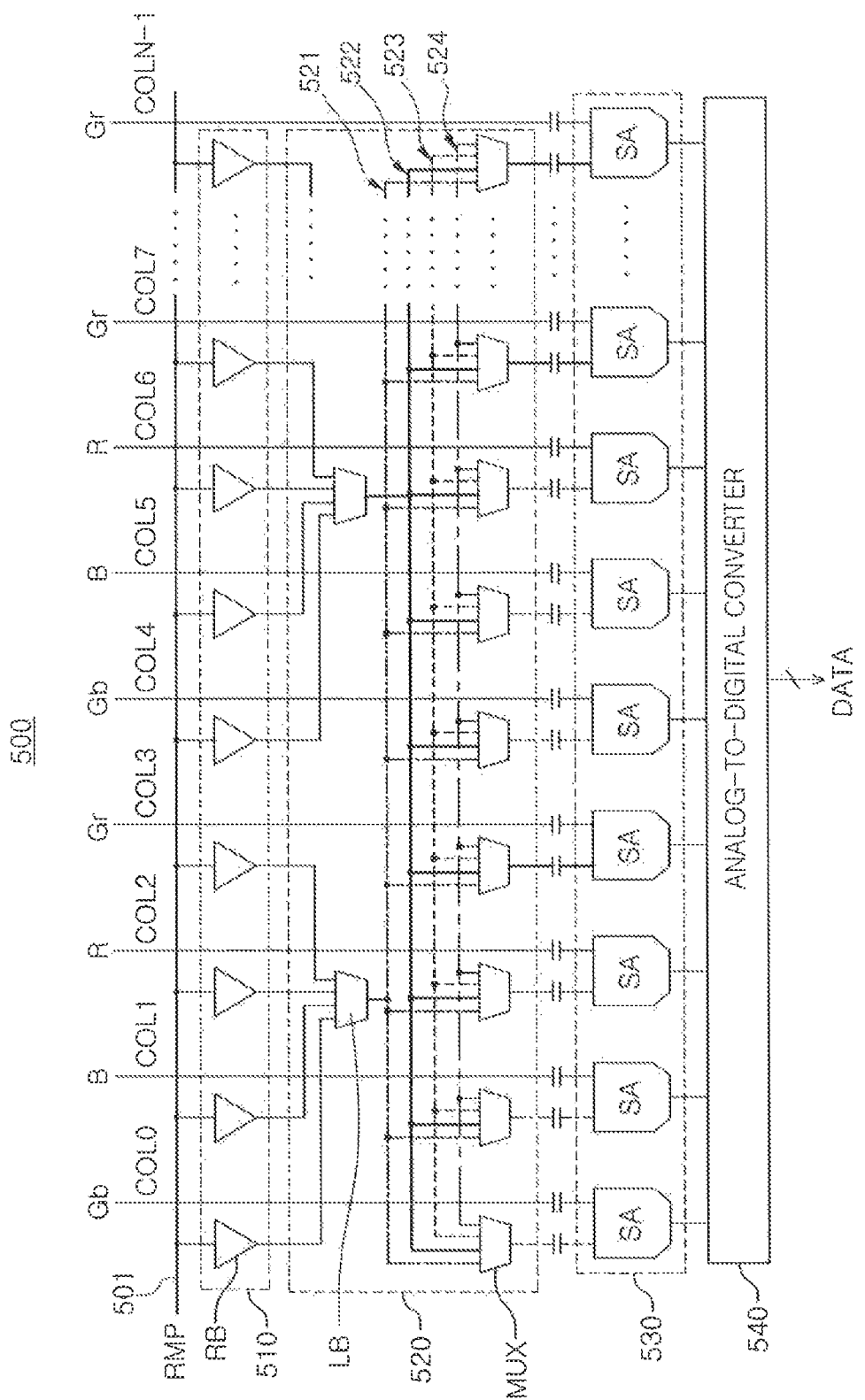

FIG. 16 is a diagram illustrating operations of the image sensor 500 in a second time period after the first time period. During the second time period, a first row line ROW0 and a second row line ROW1 may be selected in a pixel array PA1. Different from the first time period, during the second time period, 5N-2th pixels and 5N-1th pixels may be selected from among pixels connected to the first row line ROW0, and 5N-4th pixels and 5N-3th pixels may be selected from among pixels connected to the second row line ROW1 (N is a natural number). Accordingly, as illustrated in FIG. 16, the first to fourth column lines COL0 to COL3 may be connected to the third pixels Gb, the fourth pixels B, the first pixels R, and the second pixels Gr in order. In the embodiments illustrated in FIGS. 15 and 16, multiplexers MUX may connect the first input terminal of each of the samplers SA to different paths among the ramp voltage paths 521 to 524 in the first time period and the second time period.

The first t fourth ramp voltage paths 521 to 524 may correspond to the first to fourth pixels R, Gr, Gb, and B, and the ramp voltage paths selected by the multiplexers MUX during the second time period may be different from the ramp voltage paths selected by the multiplexers MUX during the first time period. Referring to FIGS. 15 and 16, the first input terminal of the sampler SA connected to the first column line COL0 may be connected to the first ramp voltage path 521 during the first time period and may be connected to the third ramp voltage path 523 during the second time period. The first input terminal of the sampler SA connected to the second column line COL1 may be connected to the second ramp voltage path 522 during the first time period and may be connected to the fourth ramp voltage path 524 during the second time period.

Figure 17:
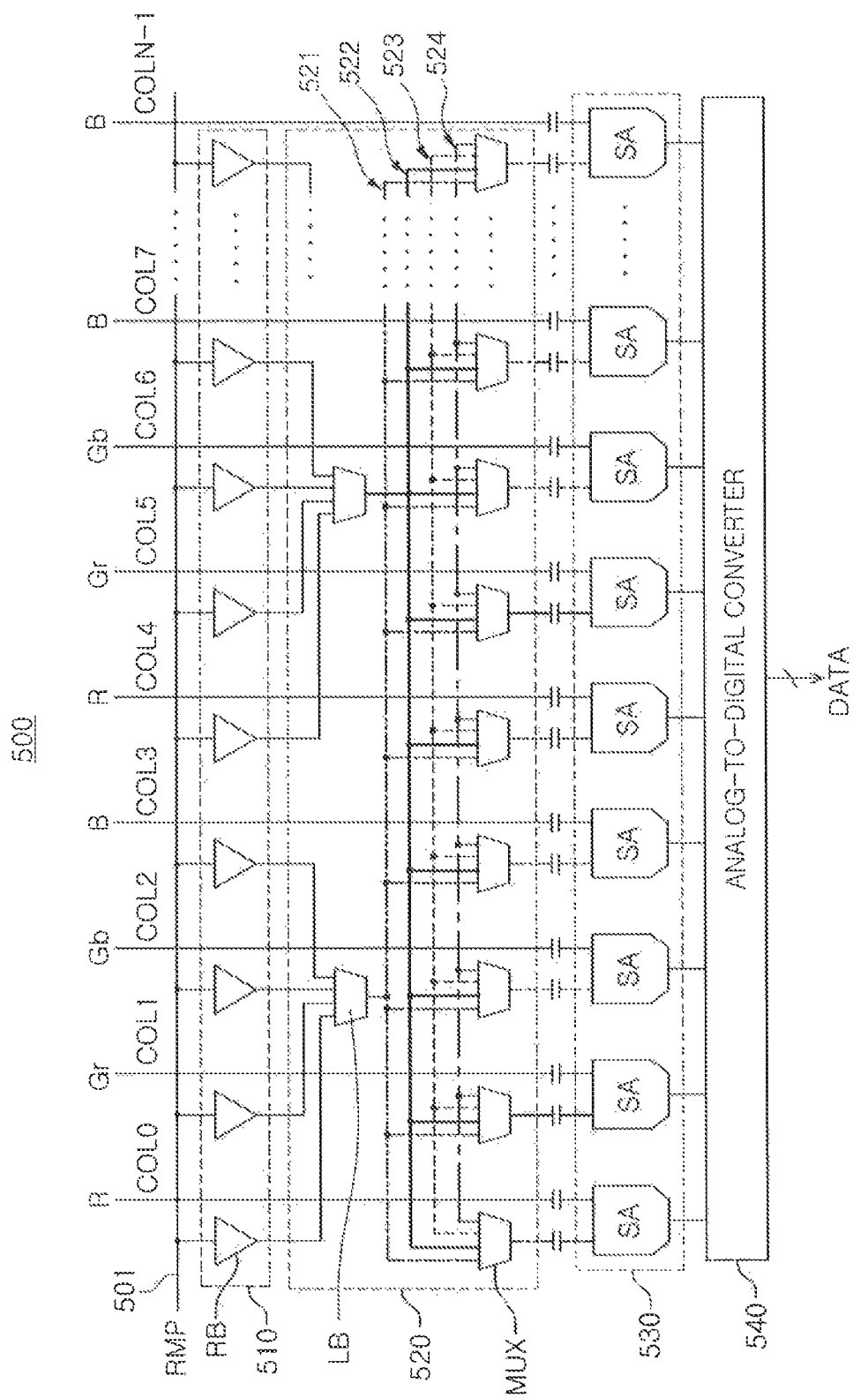
Figure 18:
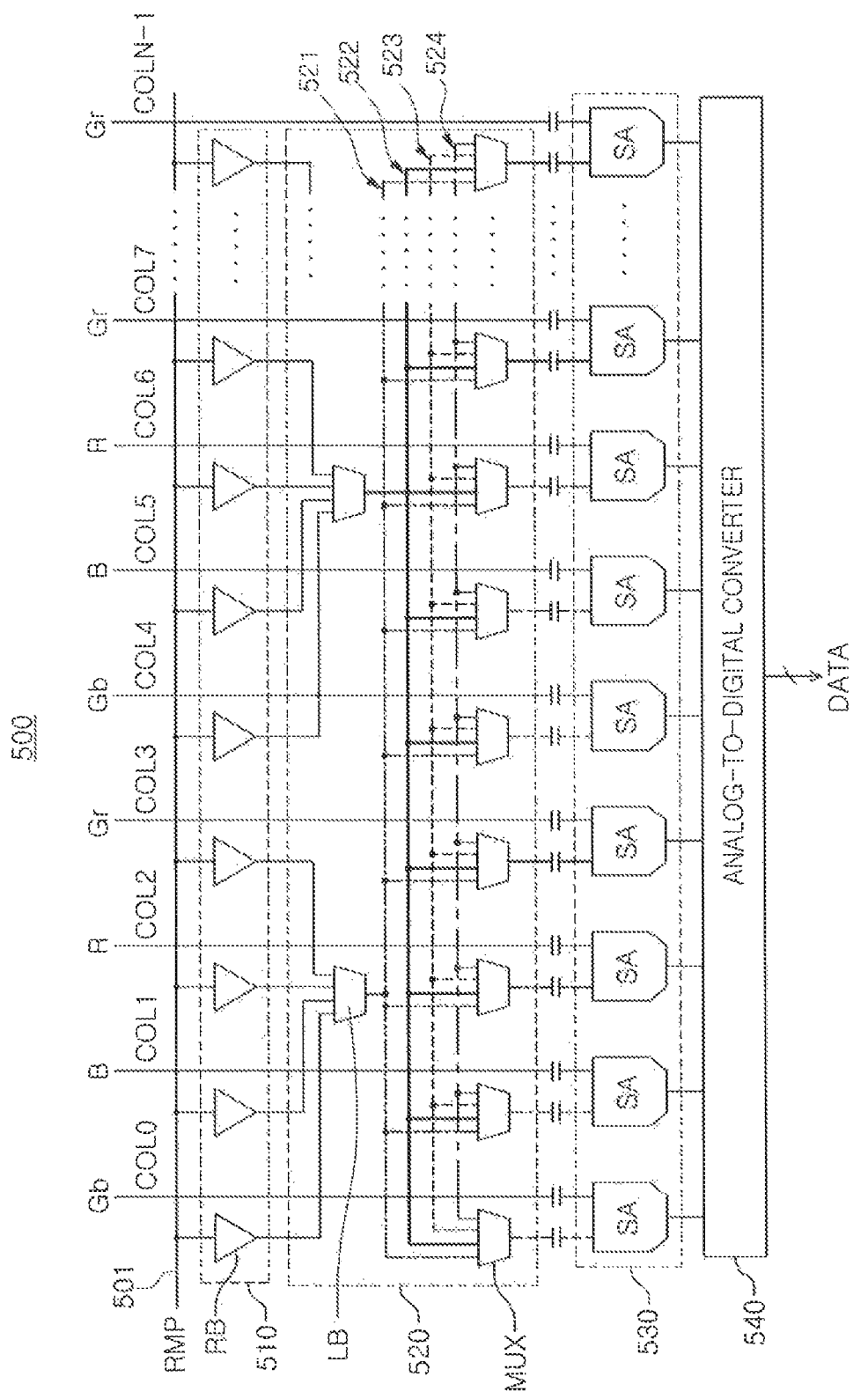

FIGS. 17 and 18 are diagrams respectively illustrating operations of the image sensor 500 in a third time period and in a fourth time period after the second time period. The pixels selected by a row driver during the third time period may be the same as the pixels selected by the row driver during the first time period. Thus, as illustrated in FIG. 17, multiplexers MUX may select one of first to fourth ramp voltage paths 521 to 524 by the same method as the method described above for the first time period and may connect the selected ramp voltage path to samplers SA during the third time period.

The pixels selected by the row driver during the fourth time period may be the same as the pixels selected by the row driver during the second time period. Thus, as illustrated in FIG. 18, the multiplexers MUX may select one of the first to fourth ramp voltage paths 521 to 524 by the same method as the method described above for the second time period and may connect the selected ramp voltage path to the samplers SA during the fourth time period.

The exemplary embodiments described with reference to FIGS. 15 to 18, the image sensor 500 operates in a first mode. In a second mode different from the first mode, regardless of types of the first to fourth pixels R, Gr, Gb, and B connected to the samplers SA, the multiplexers MUX may select one of the first to fourth ramp voltage paths 521 to 524 and may connect the selected ramp voltage path to the first input terminals of the samplers SA. The configuration described above will be described in greater detail with reference to FIG. 19.

Figure 19:
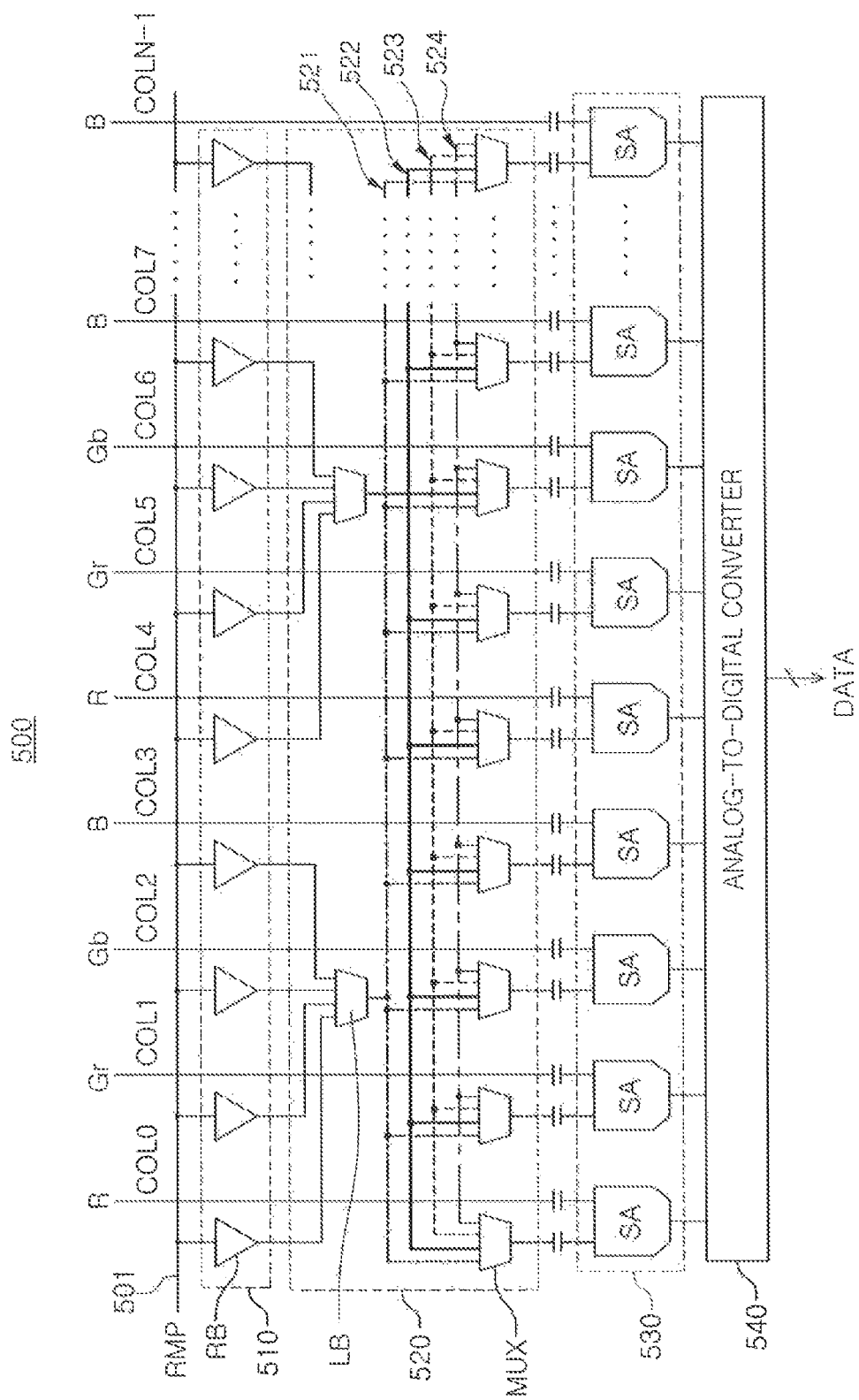

Referring to FIG. 19, multiplexers MUX may select a first ramp voltage path 521 and connect the first ramp voltage path 521 to the first input terminals of the samplers SA in a second mode. Accordingly, the first input terminals of the samplers SA may receive a ramp voltage from the first ramp voltage path 521 in common. Alternatively, the multiplexers MUX may select one of the second to fourth ramp voltage paths 522 to 524 and may connect the selected ramp voltage path to the first input terminals of the samplers SA.

The first mode may be a mode in which a relatively large amount of light is incident to a pixel array PA1, and the second mode may be a mode in which a relatively small amount of light is incident to the pixel array PA1. Alternatively, the first mode may be a mode in which a relatively high level of band noise occurs by operating the image sensor 400, and the second mode may be a mode in which a relatively high level of temporal noise occurs. The second mode may also be a mode in which the image sensor 400 operates with relatively low power consumption as compared to the first mode.

Figure 20:
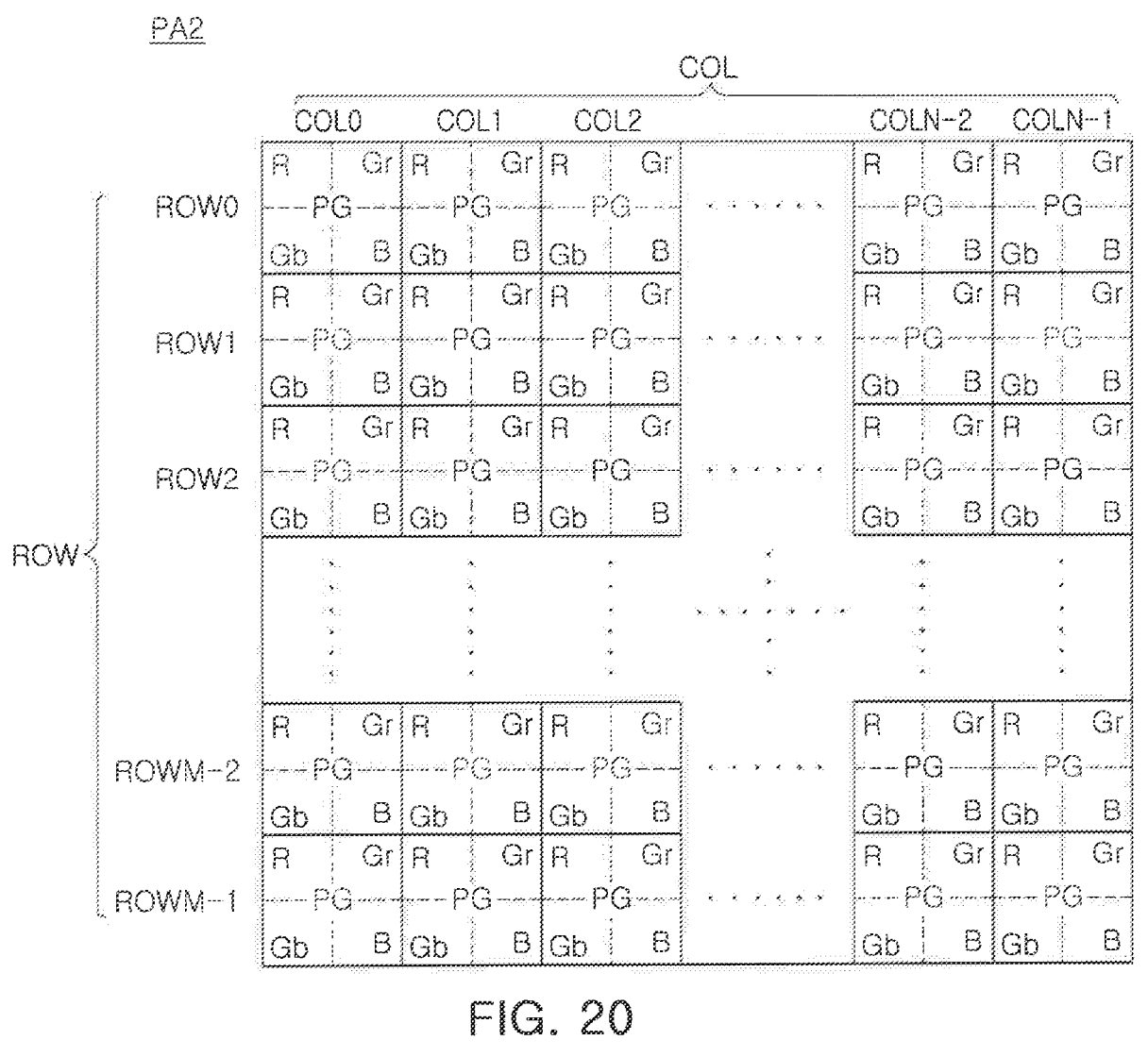

FIG. 20 is a schematic diagram illustrating a pixel array included in an image sensor according to an exemplary embodiment of the inventive concept.

Referring to FIG. 20, a pixel array PA2 in the present embodiment may include a plurality of pixels connected to intersecting points of a plurality of row lines ROW0 to ROWM−1 (ROW) and a plurality of column lines COL0 to COLN−1 (COL). Each of the plurality of pixels may include a certain color of color filter. A photodiode of each of the plurality of pixels may react to color of light passing through a color filter and may generate an electric charge.

In the pixel array PA2 illustrated in FIG. 20, the plurality of pixels may include first pixels R having red color filters, second pixels Gr having green color filters and disposed between the first pixels R in a row direction, third pixels Gb having green color filters and disposed between the first pixels R in a column direction, and fourth pixels B having blue color filters. The first to fourth pixels R, Gr, Gb, and B may be alternately arranged. In addition, the first to fourth pixels R, Gr, Gb, and B adjacent to each other in the row direction and the column direction may be a single pixel group PG, and the first to fourth pixels R, Gr, Gb, and B included in the single pixel group PG may share one of the column lines COL.

Figure 21:
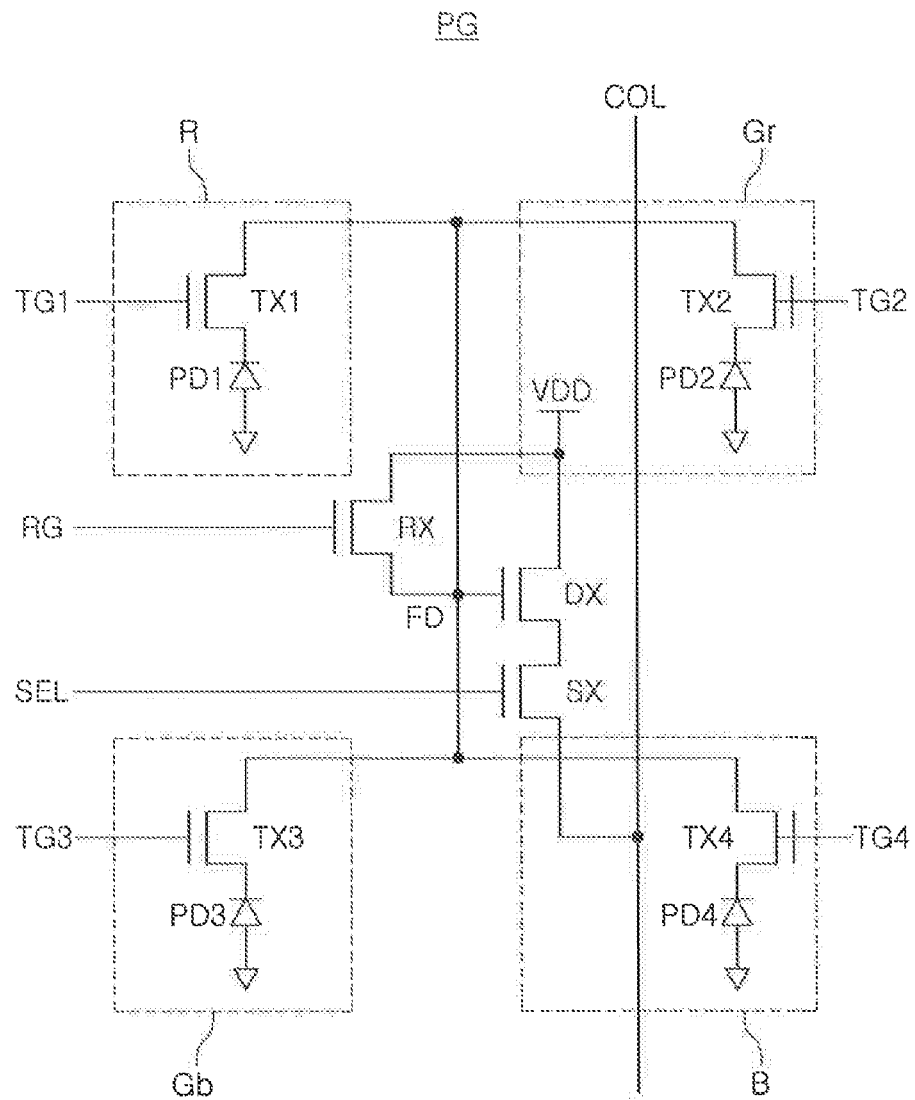
FIG. 21 is a diagram illustrating a pixel group included in a pixel array according to an exemplary embodiment of the present inventive concept.

FIG. 21 is a diagram illustrating a pixel group included in a pixel array according to an exemplary embodiment of the present inventive concept.

Referring to FIG. 21, a pixel group PG of an image sensor in the present embodiment may include a plurality of pixels arranged in a square form. In the embodiment illustrated in FIG. 21, the pixel group PG may include first to fourth pixels R, Gr, Gb, and B arranged in a 2×2 matrix form. For example, the first pixel R may include a first photodiode PD1 for reacting to light passing through a red color filter and generating an electric charge, and the fourth pixel B may include a fourth photodiode PD4 for reacting to light passing through a blue color filter and generating an electric charge. The second pixel Gr and the third pixel Gb may respectively include a second photodiode PD2 and a third photodiode PD3 for reacting to light passing through green color filters and generating an electric charge. In exemplary embodiments of the present inventive concept, the number of pixels included in the pixel group PG, an arrangement form of the pixels, colors of light to which the photodiode of each of the pixels reacts, and the like, may vary.

Referring to the circuit diagram illustrated in FIG. 21, first to fourth pixels R, Gr, Gb, and B may include first, second, third and fourth transfer transistors TX1, TX2, TX3 and TX4 for moving an electric charge generated in the first to fourth photodiodes PD1 to PD4 to a floating diffusion FD. The first to fourth pixels R, Gr, Gb, and B may share the floating diffusion FD, a drive transistor DX, a reset transistor RX, a select transistor SX with one another.

The first to fourth transfer transistors TX1 to TX4 included in the pixel group PG may be turned on one by one in certain order. As an example, when the reset transistor RX is turned on, the floating diffusion FD is reset, and the select transistor SX is turned on, a readout circuit may detect a reset voltage through the column line COL. When the first transfer transistor TX1 is turned on, and an electric charge generated in the first photodiode PD1 moves to the floating diffusion FD, the readout circuit may obtain a pixel voltage of the first pixel R through the column line COL.

After a pixel voltage of the first pixel R is obtained, the floating diffusion FD may be reset, and the readout circuit may obtain a reset voltage through the column line COL. When the second transfer transistor TX2 is turned on, and an electric charge generated in the second photodiode PD2 is accumulated in the floating diffusion FD, the readout circuit may obtain a pixel voltage of the second pixel Gr through the column line COL. The readout circuit may obtain a reset voltage and a pixel voltage sequentially from the first to fourth pixels R, Gr, Gb, and B included in the single pixel group PG. The order of detecting a reset voltage and a pixel voltage from the first to fourth pixels R, Gr, Gb, and B by the readout circuit may vary. As an example, the readout circuit may obtain a reset voltage and a pixel voltage in the order of the first pixels R, the third pixels Gb, the second pixels Gr, and the fourth pixels B.

FIGS. 22 to 25 are diagrams illustrating operations of an image sensor according to an exemplary embodiment of the present inventive concept. For ease of description, operations of an image sensor will be described with reference to the diagrams along with the pixel array PA2 illustrated in FIGS. 20 and 21. Operations of an image sensor described with reference to FIGS. 22 to 25 may also be applied to a pixel array having a structure different from a structure of the pixel array illustrated in FIGS. 20 and 21.

Figure 22:
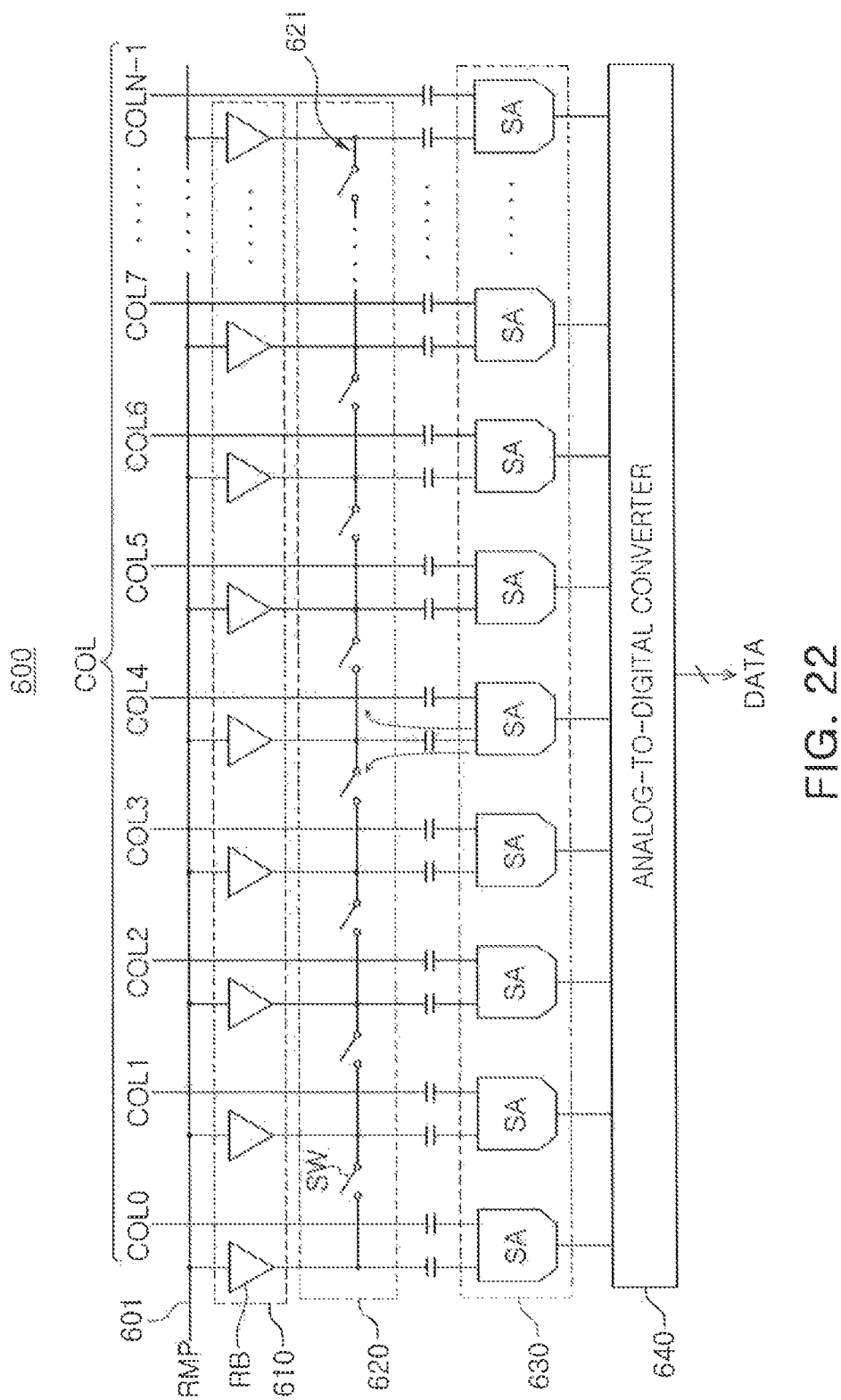
FIGS. 22, 23, 24 and 25 are diagrams illustrating operations of an image sensor according to an exemplary embodiment of the present inventive concept.

Referring to FIG. 22, an image sensor 600 may include a common ramp voltage path 601, a buffer circuit 610, a switching circuit 620, a sampling circuit 630, an ADC 640, and the like. The common ramp voltage path 601 may supply a ramp voltage RMP generated and output by a ramp voltage generator. The sampling circuit 630 may include a plurality of samplers SA. Each of the samplers SA may include a first input terminal for receiving a ramp voltage RMP and a second input terminal connected to a plurality of column lines COL0 to COLN−1 (COL).

The first input terminal of each of the samplers SA may be connected to the common ramp voltage path 601 through a ramp buffer RB and may receive a ramp voltage RMP. Ramp voltage paths 621 may be connected to the first input terminals of the samplers SA, and switching devices SW may be connected between the ramp voltage paths 621. A control logic of the image sensor 600 may improve noise properties and manage power consumption by turning off or turning on the switching devices SW.

As an example, the switching devices SW may be turned on or turned off on the basis of an operational mode of the image sensor 600, operational conditions of the image sensor 600, noise properties occurring in image data generated by the image sensor 600, and the like. As an example, when it is assumed that band noise may increase, the control logic of the image sensor 600 may turn off the switching devices SW to reduce impacts of noise of a ramp voltage generated while at least one of the samplers SA operates to the other samplers SA. In addition, when it is assumed that temporal noise may increase, the control logic of the image sensor 600 may turn on the switching devices SW to reduce temporal noise by averaging the noise.

Figure 23:
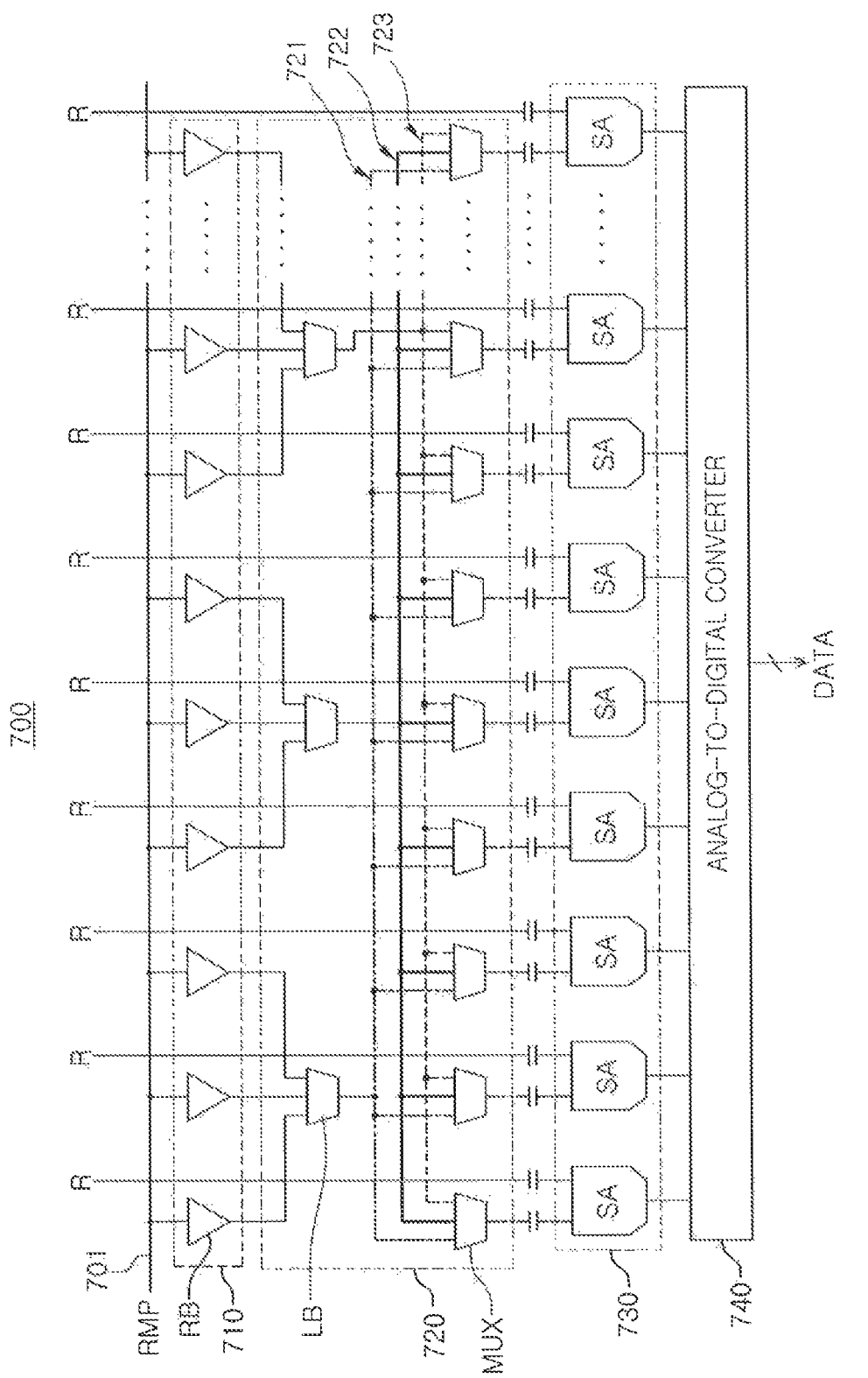
Figure 24:
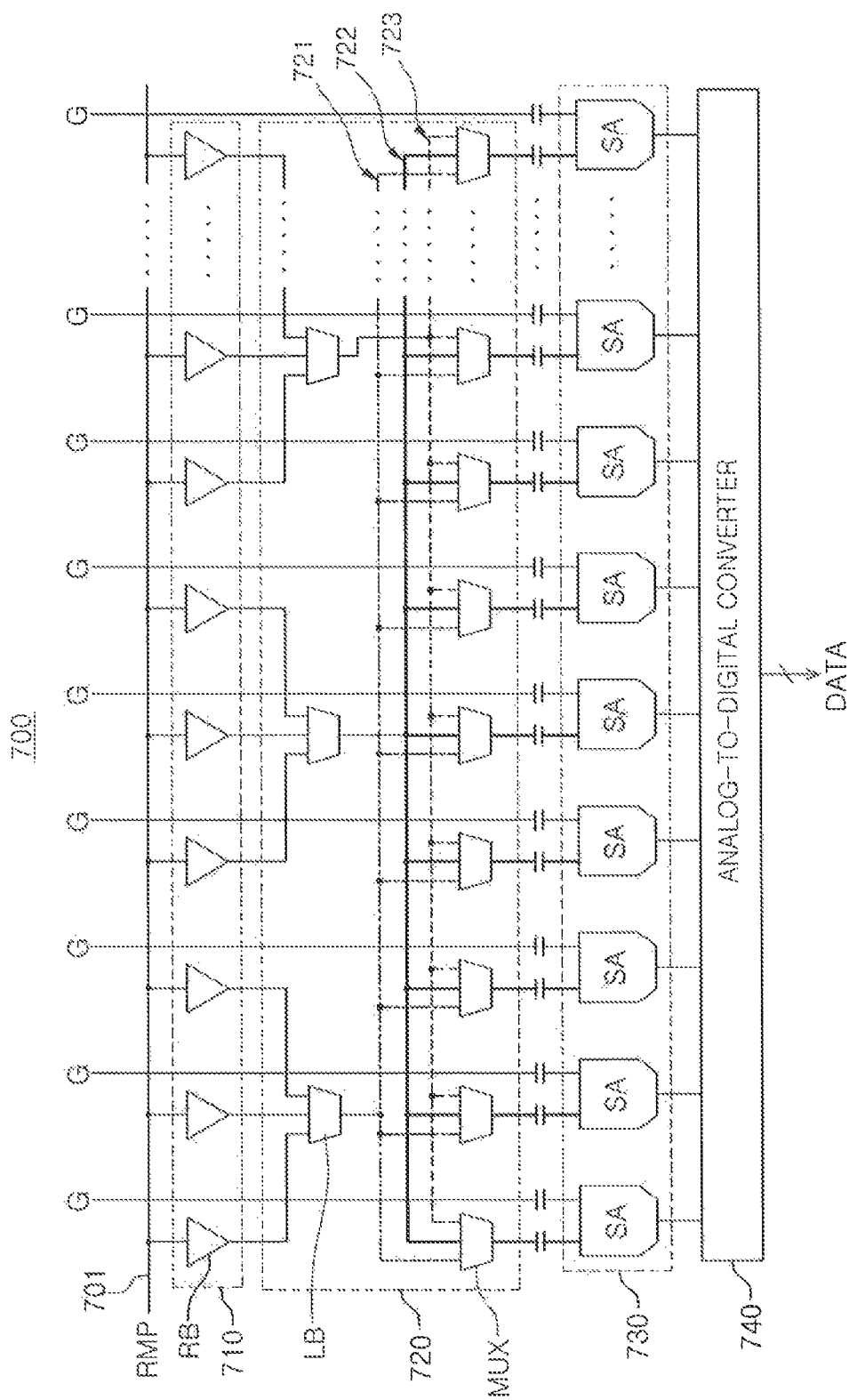
Figure 25:
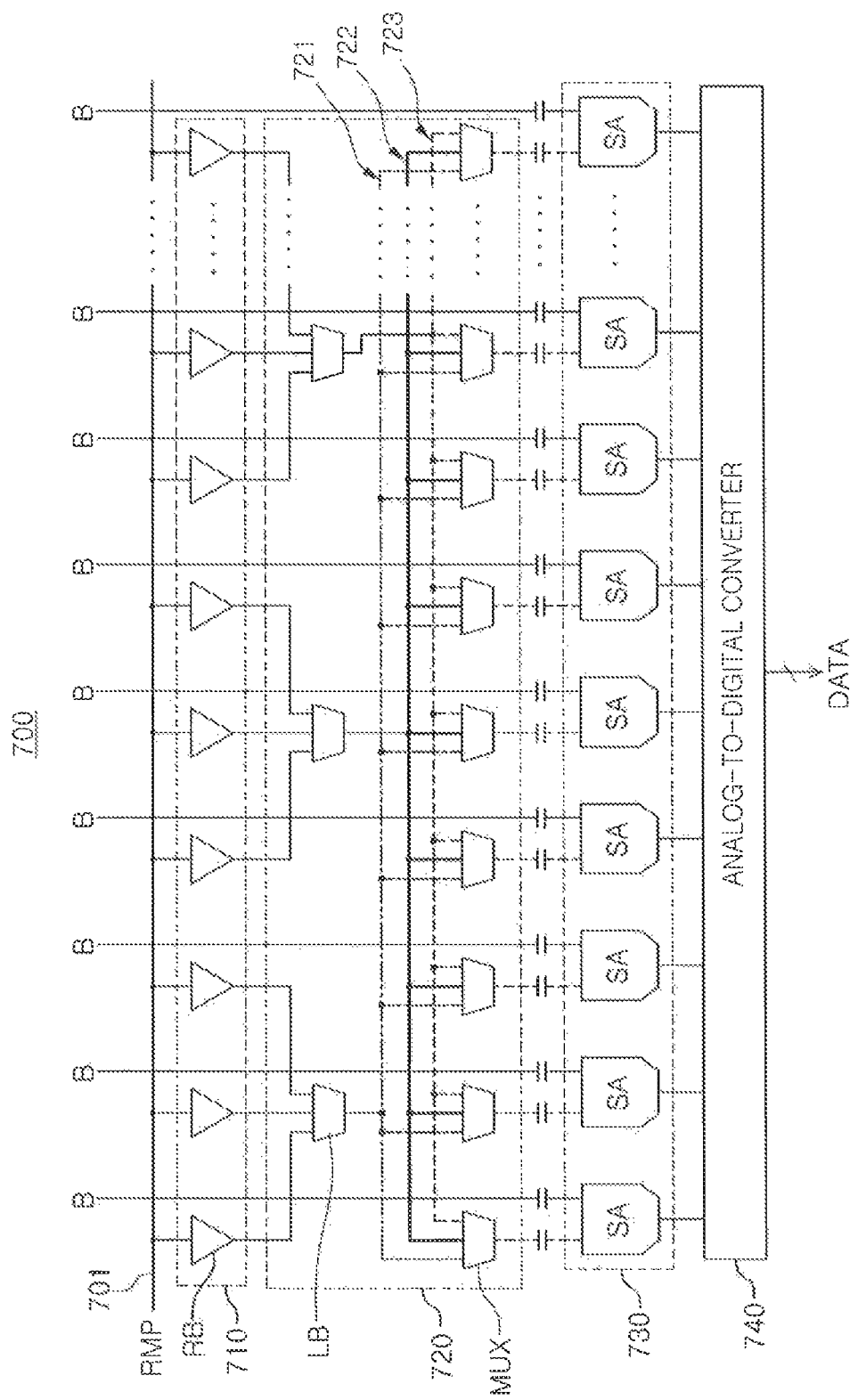

Referring to FIGS. 23 to 25, an image sensor 700 may include a common ramp voltage path 701, a buffer circuit 710, a switching circuit 720, a sampling circuit 730, an ADC 740, and the like. The configurations, the operations, and the like, of the common ramp voltage path 701, the buffer circuit 710, and the sampling circuit 730 may be similar to the configurations, the operations, and the like of the common ramp voltage path 601, the buffer circuit 610, and the sampling circuit 630, described with reference to FIG. 22.

The switching circuit 720 may include a plurality of line buffers LB, a plurality of ramp voltage paths 721, 722 and 723, plurality of multiplexers MUX, and the like. Each of the line buffers LB may include input terminals connected to two or more of ramp buffers RB and a single output terminal. The output terminal of each of the line buffers LB may be connected to one of the plurality of ramp voltage paths 721 to 723. In exemplary embodiments of the present inventive concept, the line buffers LB may be omitted, and when the line buffers LB are omitted, the output terminal of each of the plurality of ramp buffers RB may be directly connected to one of the plurality of ramp voltage paths 721 to 723.

The plurality of multiplexers MUX may select one of the plurality of ramp voltage paths 721 to 723 and may connect the selected ramp voltage path to the first input terminal of each of the samplers SA. As an example, each of the first to third ramp voltage paths 721 to 723 may be ramp voltage paths corresponding to red, green, and blue. The multiplexers MUX may select one of the first to third ramp voltage paths 721 to 723 on the basis of colors of pixels connected to the samplers SA through the column lines COL.

Referring to FIG. 23, during a first time period in which first pixels R are selected from pixel groups PG connected to a first row line ROW0, the multiplexers MUX may select the first ramp voltage path 721 and may connect the first ramp voltage path 721 to the first input terminals of the samplers SA. The first input terminals of the samplers SA may be connected to the first ramp voltage path 721 in common during the first time period.

Referring to FIG. 24, the multiplexers MUX may select the second ramp voltage path 722 and may connect the second ramp voltage path 722 to the first input terminals of the samplers SA during a second time period and a third time period after the first time period. The second time period may be a time period corresponding to a horizontal period in which the second pixels Gr are selected from the pixel groups PG connected to the first row line ROW0. The third time period may be a time period corresponding to a horizontal period in which the third pixels Gb are selected in the pixel groups PG connected to the first row line ROW0.

Referring to FIG. 25, the multiplexers MUX may select a third ramp voltage path 723 and may connect the third ramp voltage path 723 to first input terminals of samplers SA during a fourth time period after the third time period. The fourth time period may be a time period corresponding to a horizontal period in which the fourth pixels B are selected from the pixel groups PG connected to the first row line ROW0.

In the embodiments described with reference to FIGS. 22 and 25, the time for which the second ramp voltage path 722 is connected to the first input terminals of the samplers SA while a pixel array PA2 is scanned once may be longer than the time for which the first ramp voltage path 721 is connected to the first input terminals of the samplers SA and the time for which the third ramp voltage path 723 is connected to the first input terminals of the samplers SA. As an example, the time for which the second ramp voltage path 722 is connected to the first input terminals of the samplers SA may be substantially the same as a sum of the time for which the first ramp voltage path 721 is connected to the first input terminals of the samplers SA and the time for which the third ramp voltage path 723 is connected to the first input terminals of the samplers SA.

In the embodiments described with reference to FIGS. 22 and 25, the switching circuit 720 may further include a fourth ramp voltage path in addition to the first to third ramp voltage paths 721 to 723. The first to fourth ramp voltage path may be provided as a path through which a ramp voltage is input to the samplers SA when a reset voltage and a pixel voltage are detected from each of the first to fourth pixels R, Gr, Gb, and B.

Figure 26:
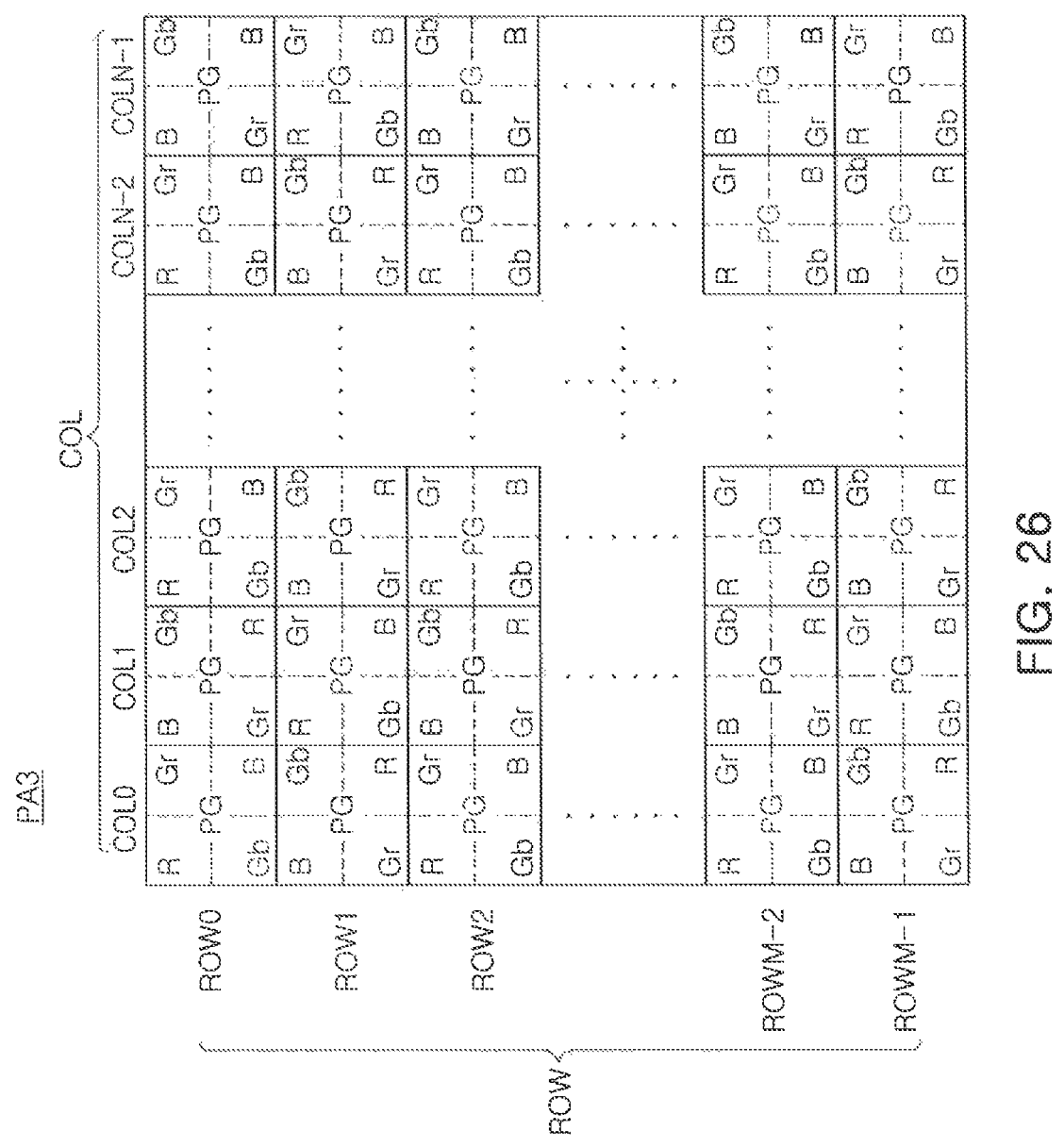

FIG. 26 is a schematic diagram illustrating a pixel array included in an image sensor according to an exemplary embodiment of the present inventive concept.

Referring to FIG. 26, a pixel array PA3 may include a plurality of pixels connected to intersecting points of a plurality of row lines ROW0 to ROWM-1 (ROW) and a plurality of column lines COL0 to COLN-1 (COL). The plurality of pixels may include first pixels R having red color filters, second pixels Gr having green color filters and disposed between the first pixels R in a row direction, third pixels Gb having green filters and disposed between the first pixels R in a column direction, and fourth pixels B having blue color filters. The first to fourth pixels R, Gr, Gb, and B adjacent to each other in the row direction and the column direction may be a single pixel group PG, and the first to fourth pixels R, Gr, Gb, and B included in the single pixel group PG may share one of the column lines COL. In the embodiment illustrated in FIG. 26, arrangements of the first to fourth pixels R, Gr, Gb, and B may be different in each of the pixel groups PG adjacent to each other.

FIGS. 27 to 30 are diagrams illustrating operations of an image sensor according to an exemplary embodiment of the present inventive concept. For ease of description, operations of an image sensor will be described with reference to the diagrams along with the pixel array PA3 illustrated in FIG. 26. Operations of an image sensor described with reference to FIGS. 27 to 30 may also be applied to pixel arrays having a structure different from a structure of the pixel array PA1 illustrated in FIG. 26.

Referring to FIGS. 27 to 30, an image sensor 800 in the present embodiment may include a common ramp voltage path 801 for supplying a ramp voltage RMP, a buffer circuit 810, a switching circuit 820, a sampling circuit 830, an ADC 840, and the like. The configurations of the common ramp voltage path 801, the buffer circuit 810, the switching circuit 820, the sampling circuit 830, and the ADC 840 may be similar to those described with reference to FIGS. 7 and 8.

Figure 27:
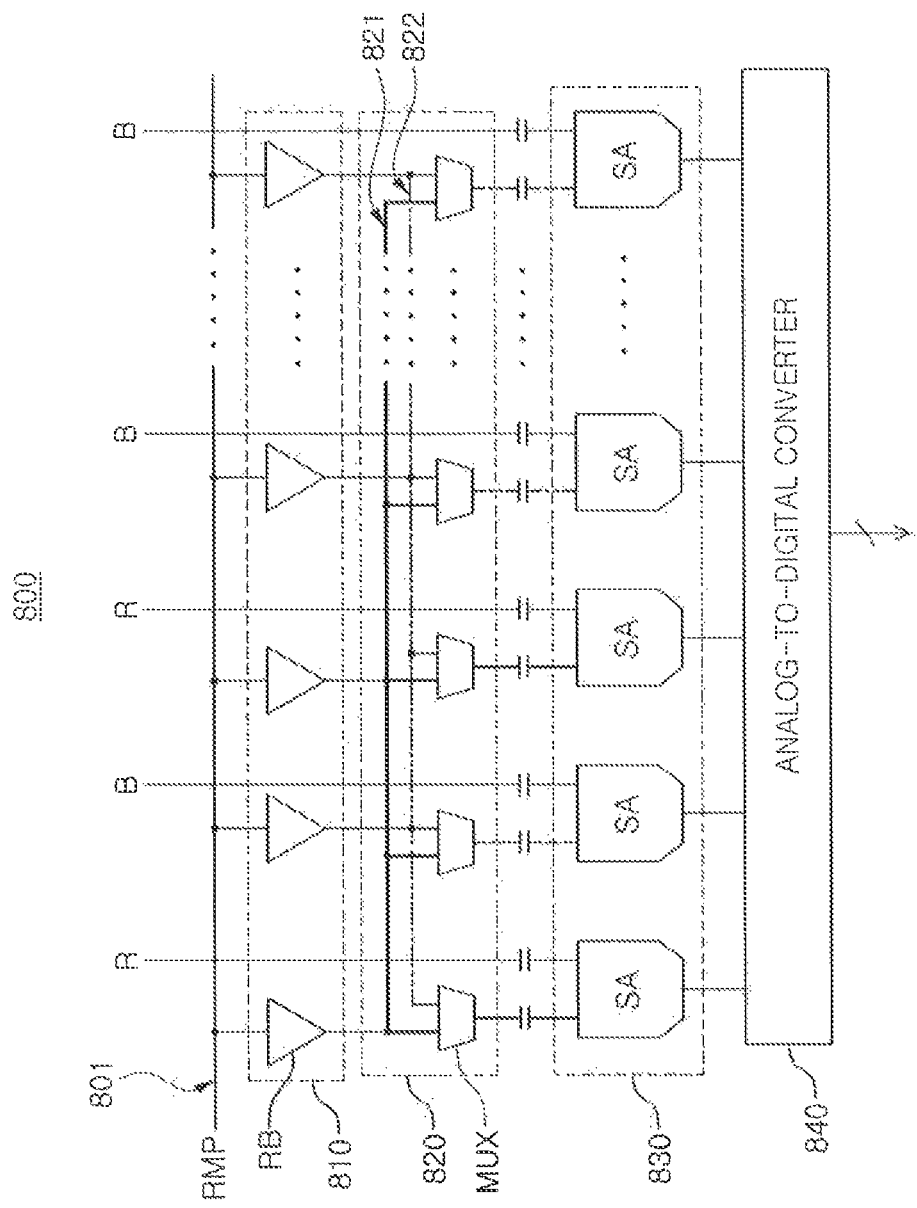
FIGS. 27, 28, 29 and 30 are diagrams illustrating operations of an image sensor according to an exemplary embodiment of the present inventive concept.

When a row driver scans a first row line ROW0, first pixels R may be selected in odd-numbered pixel groups PG, and fourth pixels B may be selected in even-numbered pixel groups PG, during a first time period. Accordingly, as illustrated in FIG. 27, samplers SA connected to odd-numbered column lines may receive a ramp voltage RMP from first ramp voltage paths 821 by multiplexers MUX. In addition, the samplers SA connected to even-numbered column lines may receive a ramp voltage RMP from second ramp voltage paths 822 by the multiplexers MUX. Degradation of linearity of the image sensor 800 may be reduced by comparing a reset voltage and a pixel voltage output by pixels reacting to the same color of light and generating an electric charge with the ramp voltage supplied from a single ramp voltage path.

Figure 28:
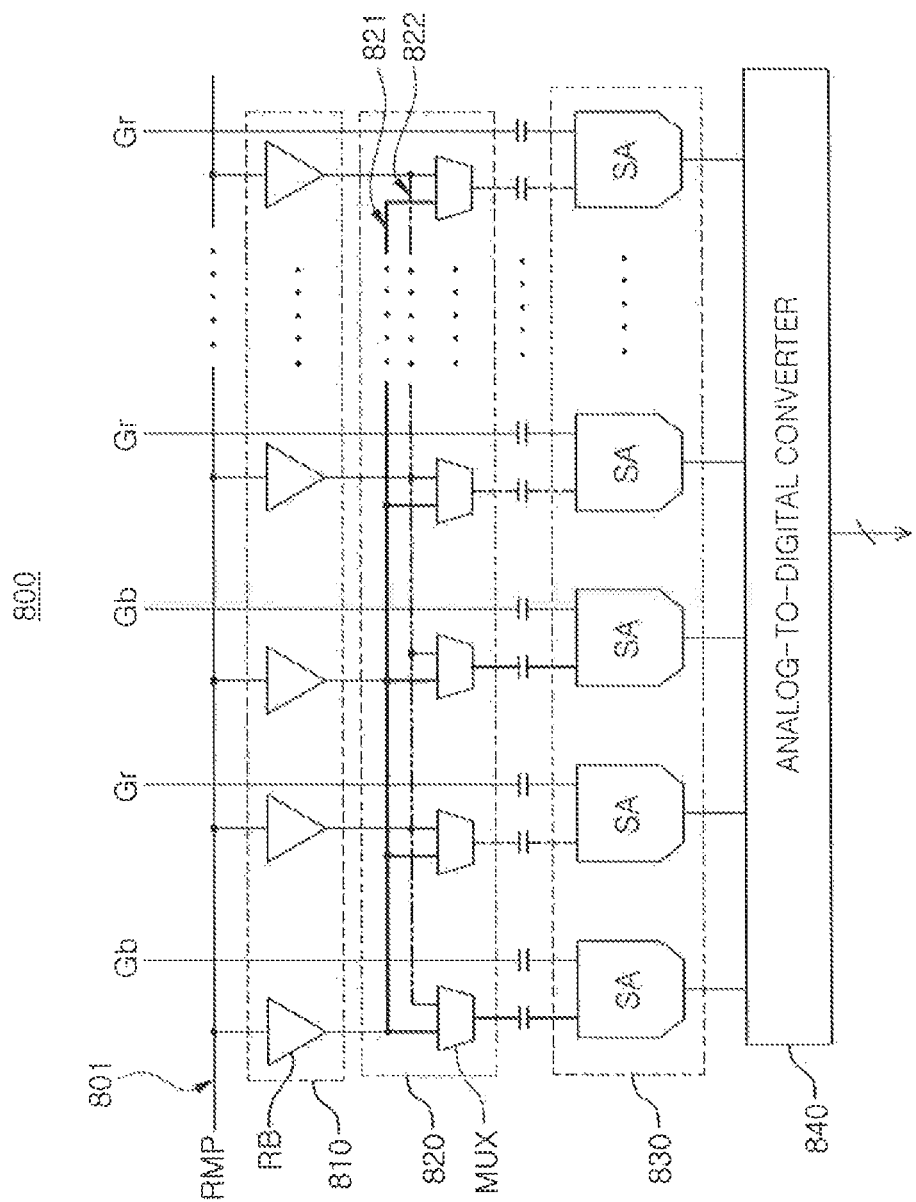

When a second time period starts after a first time period terminates, as illustrated in FIG. 28, the odd-numbered column lines may be connected to the third pixels Gb, and the even-numbered column lines may be connected to the second pixels Gr. The samplers SA connected to the odd-numbered column lines may receive a ramp voltage RMP from the first ramp voltage paths 821 selected by the multiplexers MUX. In addition, the samplers SA connected to the even-numbered column lines may receive a ramp voltage RMP from the second ramp voltage paths 822 selected by the multiplexers MUX. The second pixels Gr and the third pixels Gb may react to green light and generate an electric charge, but data respectively obtained in the second pixels Gr and the third pixels Gb may be processed separately in the image-processing of the image sensor 800 or another processor connected to the image sensor 800. Thus, the samplers SA connected to the second pixels Gr and the samplers SA connected to the third pixels Gb during the second time period may receive a ramp voltage RMP through different ramp voltage paths 821 and 822.

Figure 29:
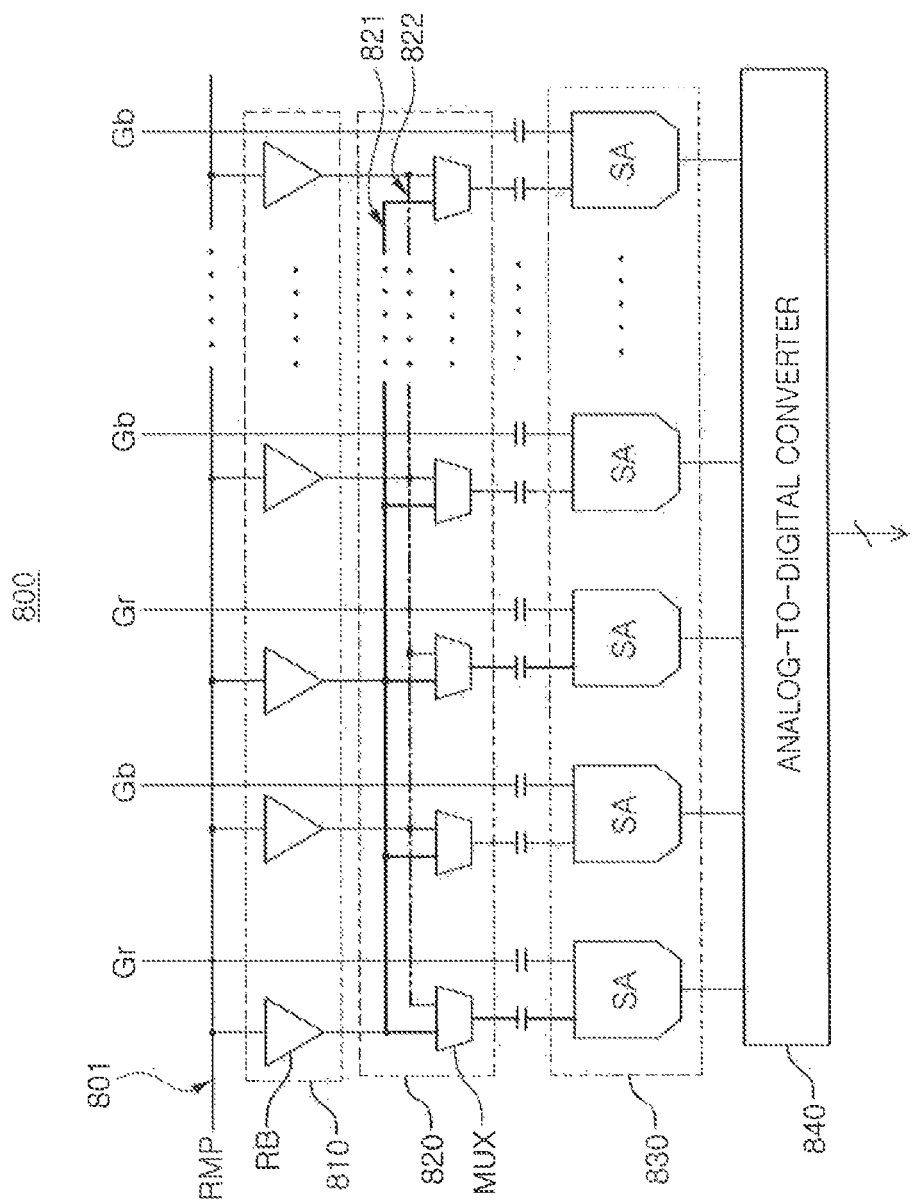

FIG. 29 is a diagram illustrating operations performed in a third time period after the second time period. In the present embodiment, during the third time period, odd-numbered column lines may be connected to the second pixels Gr, and even-numbered column lines may be connected to the third pixels Gb. Multiplexers MUX may connect first input terminals of samplers SA connected to the odd-numbered column lines to the first ramp voltage path 821, and may connect the first input terminals of the samplers SA connected to the even-numbered column lines to the second ramp voltage path 822.

Figure 30:
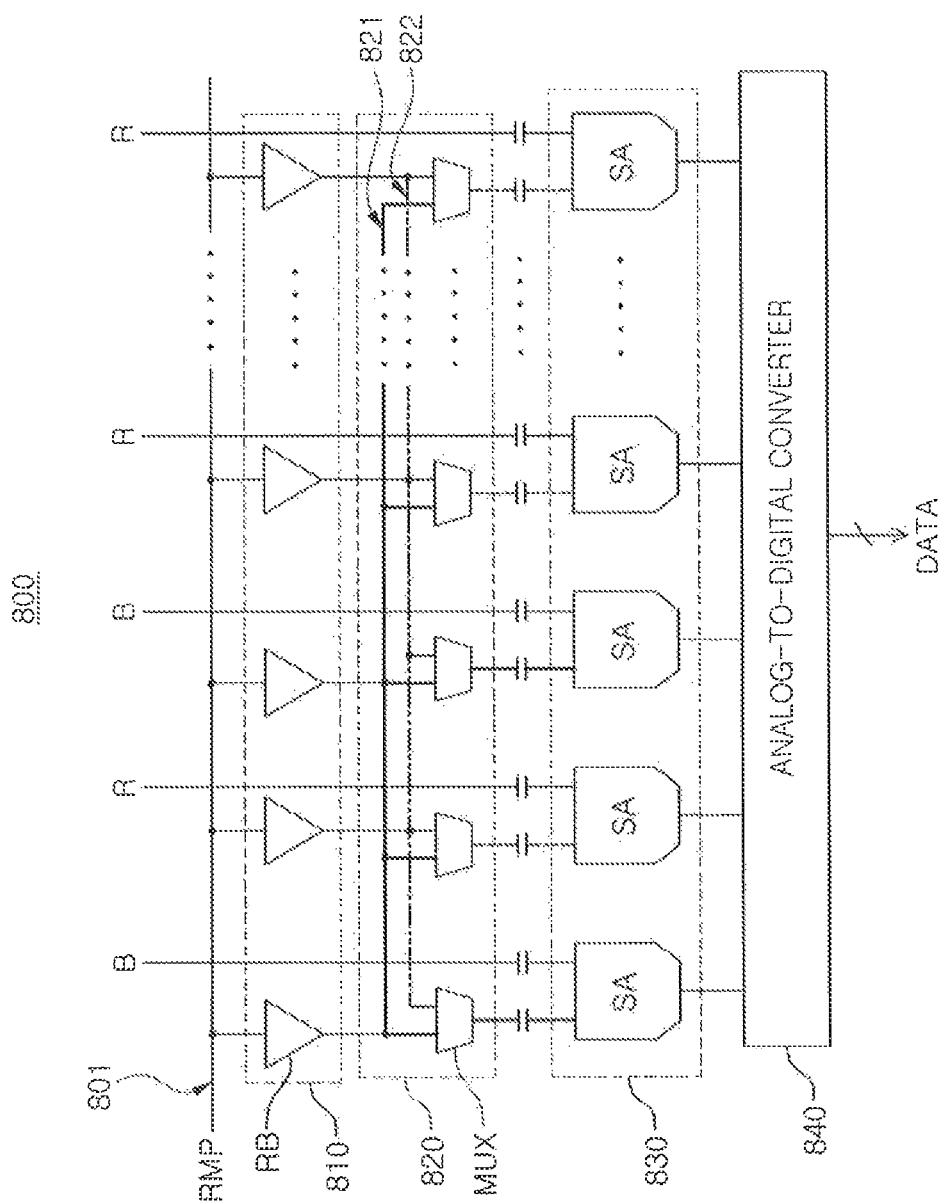

FIG. 30 is a diagram illustrating operations of the image sensor 800 during a fourth time period after the third time period. Referring to FIG. 30, odd-numbered column lines may be connected to the fourth pixels B, and even-numbered column lines may be connected to the first pixels R, during the fourth time period. Multiplexers MUX may connect first input terminals of samplers SA connected to the odd-numbered column lines to the first ramp voltage path 821, and may connect the first input terminals of the samplers SA connected to the even-numbered column lines to the second ramp voltage path 822 such that the samplers SA connected to the same color pixels may share the same ramp voltage path.

In the exemplary embodiment of the present inventive concept described with reference to FIGS. 27 to 30, a switching operation of the multiplexers MUX may not be performed during the first to fourth time periods. The samplers SA connected to the odd-numbered column lines may be continuously connected to the first ramp voltage path 821 during the first to fourth time periods by the multiplexers MUX. The samplers SA connected to the even-numbered column lines may be continuously connected to the second ramp voltage path 822 during the first to fourth time periods by the multiplexers MUX.

In exemplary embodiments of the present inventive concept, a third ramp voltage path may be added to the switching circuit 830 in addition to the first and second ramp voltage paths 821 and 822. The first to third ramp voltage paths may output a ramp voltage RMP compared with a reset voltage and a pixel voltage output by pixels reacting to red light, green light, and blue light. Alternatively, in addition to the first and second ramp voltage paths 821 and 822, third and fourth ramp voltage paths may be added to the switching circuit 820, and each of the first to fourth ramp voltage paths may be configured to correspond to the first to fourth pixels R, Gr, Gb, and B, respectively.

Figure 31:
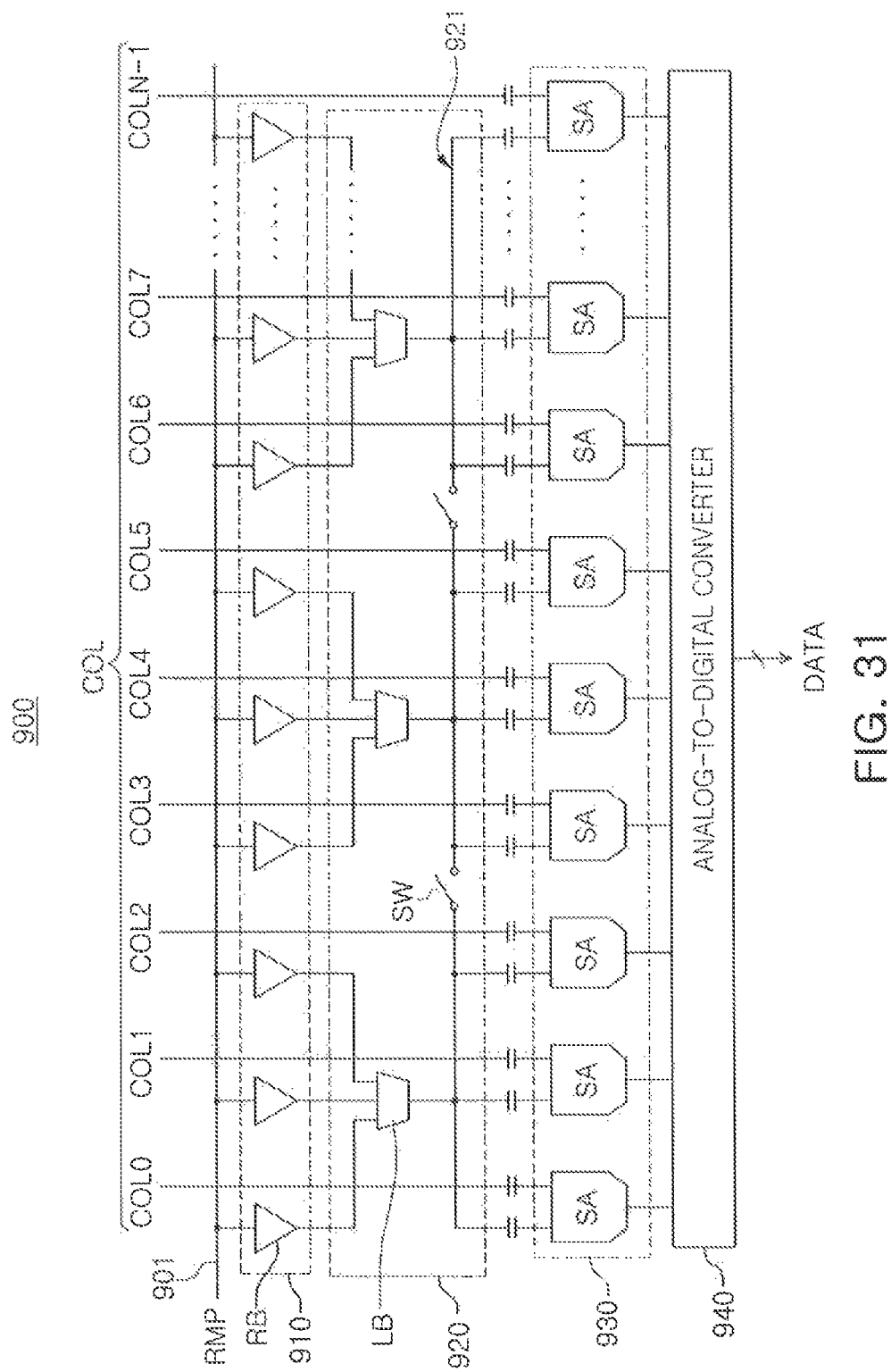
FIGS. 31 and 32 are diagrams illustrating operations of an image sensor according to an exemplary embodiment of the present inventive concept.
Figure 32:
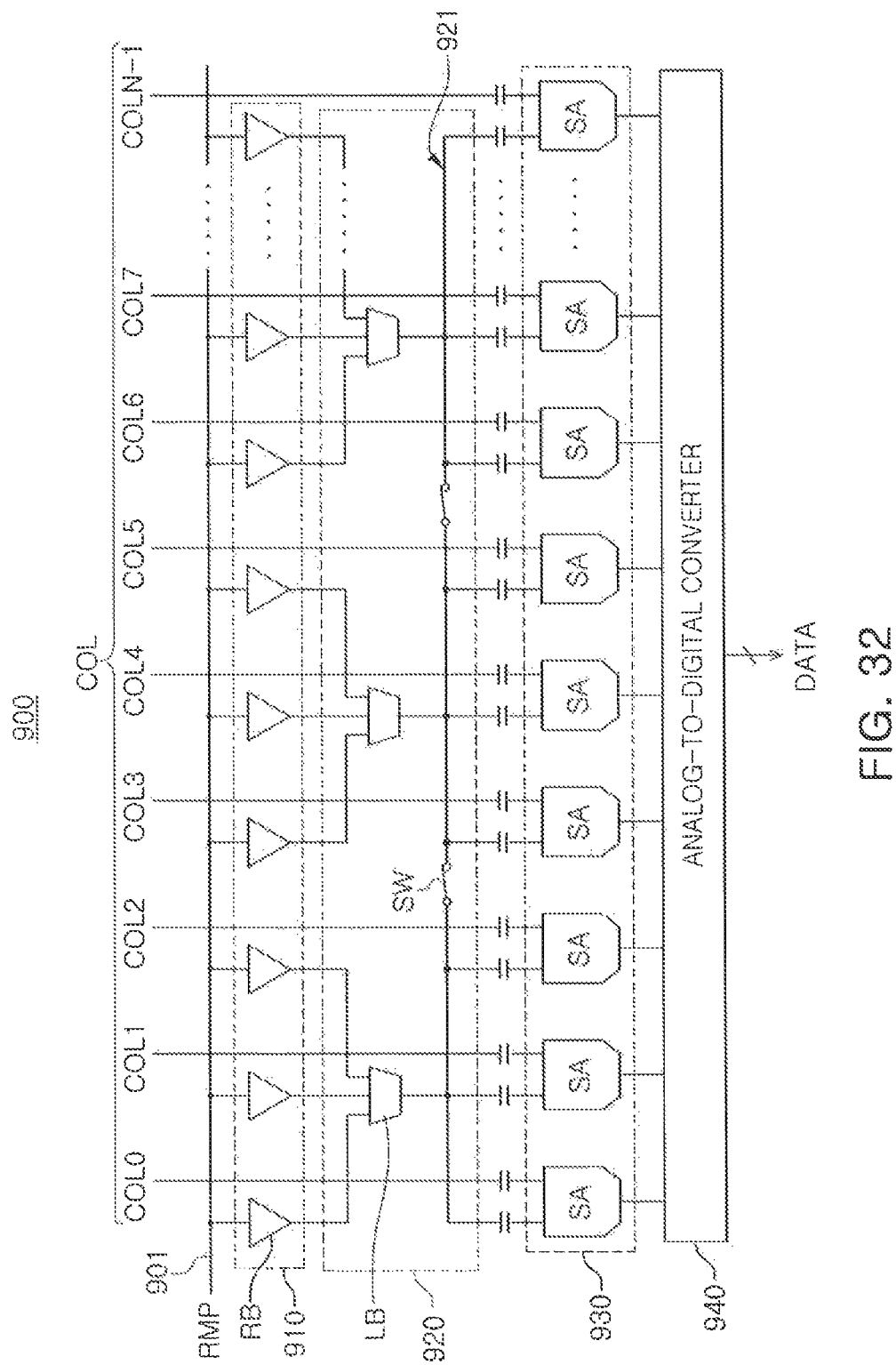

FIGS. 31 and 32 are diagrams illustrating operations of an image sensor according to an exemplary embodiment of the present inventive concept. FIGS. 31 and 32 are diagrams illustrating a portion of a readout circuit included in an image sensor, according to an exemplary embodiment of the present inventive concept.

Referring to FIGS. 31 and 32, an image sensor 900 in the present embodiment may include a common ramp voltage path 901 for supplying a ramp voltage RMP, a buffer circuit 910 having a plurality of ramp buffers RB, a switching circuit 920, a sampling circuit 930, an ADC 940, and the like. The configurations and operations of the buffer circuit 910, the sampling circuit 930, and the ADC 940 may be similar to those described above for other embodiments of the present inventive concept.

The switching circuit 920 may include a plurality of line buffers LB, switching devices SW, and ramp voltage paths 921. The plurality of line buffers LB may group outputs of two or more ramp buffers RB as a single output. An output terminal of each of the plurality of line buffers LB may be connected to one of the ramp voltage paths 921. The ramp voltage paths 921 may be connected to each other or disconnected from each other by the switching devices SW.

The switching devices SW may be controlled by a control logic of the image sensor 900. The control logic of the image sensor 900 may control the switching devices SW on the basis of an operational mode of the image sensor 900, operational conditions of the image sensor 900, noise properties occurring in image data generated by the image sensor 900, a register value stored in the control logic, and the like.

As an example, when strength of light incident from the outside is strong, the control logic of the image sensor 900 may turn off the switching devices SW as illustrated in FIG. 31. For example, the switching devices SW may be opened. When strength of light incident from the outside is weak, the control logic of the image sensor 900 may turn on the switching devices SW as illustrated in FIG. 32. For example, the switching devices SW may be closed. The control logic of the image sensor 900 may sense an external illumination, and may compare the result value with a threshold value, thereby determining whether to turn on or turn off the switching devices SW.

The control logic of the image sensor 900 may control the switching devices SW on the basis of a register value stored in advance. As an example, after an electronic device on which the image sensor 900 is mounted is sold to an end-user, the method used by the control logic to control the switching devices SW may change by a newly distributed firmware.

Figure 33:
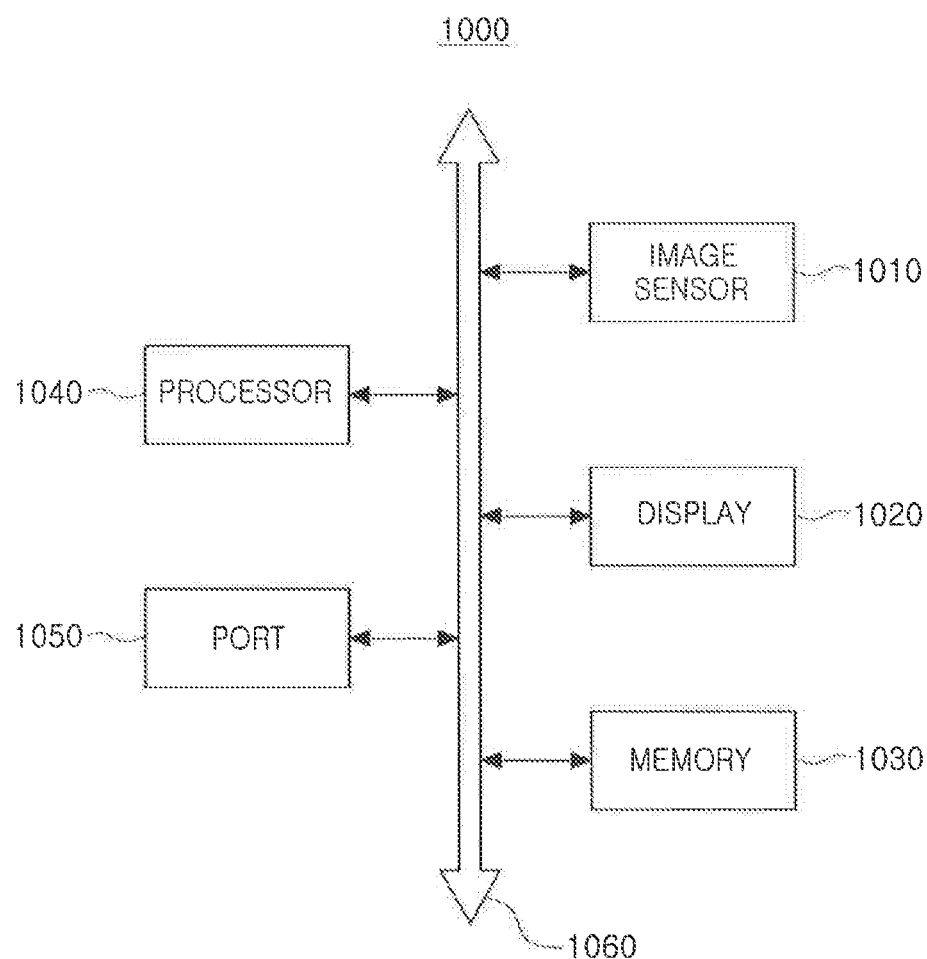
FIG. 33 is a block diagram illustrating an electronic device including an image sensor according to an exemplary embodiment of the present inventive concept.

FIG. 33 is a block diagram illustrating an electronic device including an image sensor according to an exemplary embodiment of the present inventive concept.

A computer device 1000 illustrated in FIG. 33 may include an image sensor 1010, a display 1020, a memory 1030, a processor 1040, a port 1050, and the like. In addition to the elements above, the computer device 1000 may further include a wireless communication device, a power device, and the like. The port 1050 among the elements illustrated in FIG. 33 may be a device provided for the computer device 1000 to communicate with a video card, a sound card, a memory card, a universal serial bus (USB) device, and the like. The computer device 1000 may be a smartphone, a tablet personal computer (PC), a smart wearable device, and the like, in addition to a general desktop computer or a laptop computer.

The processor 1040 may perform a certain calculation or may process a command or a task. The processor 1040 may be a central processing unit (CPU), a microprocessor unit (MCU), a system-on-chip (SoC), or the like. The processor 1040 may communicate with the image sensor 1010, the display 1020, the memory device memory 1030, and also with other devices connected to the port 1050 through a bus 1060.

The memory 1030 may be a storage medium for storing data used to operate the computer device 1000, multimedia data, or the like. The memory 1030 may include a volatile memory such as a random access memory (RAM), or a non-volatile memory such as a flash memory. The memory 1030 may include at least one of a solid state drive (SSD), a hard disk drive (HDD), and an optical disk drive (ODD). The input and output device 1020 may include an input device such as a keyboard, a mouse, a touch screen, and the like, and an output device such as a display, an audio output unit, and the like.

The image sensor 1010 may be mounted on a package substrate and may be connected to the processor 1040 through the bus 1060 by another communication means. The image sensor 1010 may be employed in the computer device 1000 in forms described in the exemplary embodiments of the present inventive concept described with reference to FIGS. 1 to 32.

According to the aforementioned exemplary embodiments, the first input terminals of the sampling circuits to which a ramp voltage is input may be selectively connected to each other or disconnected from each other. By connecting the first input terminals of the sampling circuits to each other or disconnecting the first input terminals of the sampling circuits from each other on the basis of an operational mode and operational conditions of the image sensor, noise elements highly likely to occur may be significantly reduced, and degradation of linearity may be prevented, thereby improving performance of an image sensor.

According to the aforementioned exemplary embodiments, there is provided an image sensor capable of improving noise properties caused by a ramp voltage input to sampling circuits, which acquire a reset voltage and a pixel voltage, while significantly reducing a trade-off in relation to a circuit area and power consumption.

While the present inventive concept has been shown and described with reference to exemplary embodiments thereof, it will be apparent to those skilled in the art that modifications and variations could be made thereto without departing from the scope of the present inventive concept as defined by the appended claims.

The invention claimed is:

1. An image sensor, comprising:
a pixel array having a plurality of pixels connected to a plurality of row lines and a plurality of column lines;
a plurality of ramp buffers configured to output a ramp voltage generated by a ramp voltage generator and provided to inputs of the ramp buffers through a common ramp voltage path;
a sampling circuit including a plurality of samplers, each of the plurality of samplers having a first input terminal for receiving the ramp voltage and a second input terminal connected to one of the plurality of column lines; and
a switching circuit configured to connect the first input terminals of the samplers to each other or disconnect the first input terminals of the samplers from each other,
wherein when the first input terminals of the samplers are connected to each other,
the first input terminal of a first sampler and the first input terminal of a second sampler are connected to each other through a ramp voltage path different from the common ramp voltage path, the ramp voltage path is connected to an output terminal of a first ramp buffer and an output terminal of a second ram buffer, the output terminal of the first ramp buffer is connected to the first input terminal of the first sampler, and the output terminal of the second ramp buffer is connected to the first input terminal of the second sampler.

2. The image sensor of claim 1, wherein the switching circuit includes a plurality of switching devices connected between the first input terminals of the samplers.

3. The image sensor of claim 2, wherein the plurality of switching devices are turned off in a first mode, and are turned on in a second mode different from the first mode, and
wherein a strength of light introduced into the pixel array in the first mode is greater than the strength of light introduced into the pixel array in the second mode.

4. The image sensor of claim 1, wherein the switching circuit includes a plurality of ramp voltage paths for receiving the ramp voltage from the ramp buffers, and a plurality of multiplexers for selecting one of the plurality of ramp voltage paths and connecting the selected ramp voltage path to the first input terminals of the samplers.

5. The image sensor of claim 4, wherein the plurality of multiplexers connect the first input terminals of the samplers connected to pixels having color filters of the same color to one of the plurality of ramp voltage paths in common.

6. The image sensor of claim 4, wherein the plurality of multiplexers connect the first input terminals of the samplers disposed adjacent to each other to different ramp voltage paths.

7. The image sensor of claim 4, wherein the plurality of multiplexers connect the first input terminals of the samplers to different ramp voltage paths in a first time period and a second time period after the first time period.

8. The image sensor of claim 4, wherein the plurality of multiplexers connect the first input terminals of the samplers to a single ramp voltage path in a first time period and a second time period after the first time period.

9. The image sensor of claim 4, wherein the plurality of multiplexers connect two or more of the first input terminals of the samplers to different ramp voltage paths in a first mode, and connect the first input terminals of the samplers to one of the ramp voltage paths in a second mode different from the first mode.

10. The image sensor of claim 9, wherein a strength of light introduced into the pixel array in the first mode is greater than the strength of light introduced into the pixel array in the second mode.

11. The image sensor of claim 4, wherein each of the plurality of ramp voltage paths receives the ramp voltages from different ramp buffers.

12. The image sensor of claim 4, wherein the switching circuit further includes a plurality of line buffers for connecting portions of the ramp buffers to one of the plurality of ramp voltage paths.

13. The image sensor of claim 1, wherein the switching circuit includes a plurality of line buffers each having a plurality of input terminals connected to two or more of the ramp buffers, and a single output terminal connected to two or more of the first input terminals of the samplers; and
 a plurality of switching devices connected between the output terminals of the plurality of line buffers.

14. An image sensor, comprising:
 a pixel array having a plurality of first pixels connected to a first column line and a plurality of second pixels connected to a second column line;
 a plurality of ramp voltage paths for receiving a ramp voltage output through a common ramp voltage path by a ramp voltage generator;
 a first sampler connected to at least one of the ramp voltage paths and to the first column line;
 a second sampler connected to at least one of the ramp voltage paths and to the second column line; and
 a control logic configured to connect the first sampler and the second sampler to one of the ramp voltage paths in common in a first mode, and connect the first sampler and the second sampler to different ramp voltage paths in a second mode different from the first mode,
 wherein the ramp voltage path to which the first sampler and the second sampler are connected in the first mode is connected to an output of a single line buffer that is connected to a plurality of ramp buffers at its input.

15. The image sensor of claim 14, wherein a strength of light introduced into the pixel array in the first mode is less than the strength of light introduced into the pixel array in the second mode.

16. The image sensor of claim 14, wherein the ramp voltage paths include a plurality of unit ramp voltage paths connected to each other or disconnected from each other by a plurality of switching devices, and
 wherein the control logic configures the one or more ramp voltage paths as a single ramp voltage path by turning on the plurality of switching devices in the first mode, and configures the one or more ramp voltage paths as a plurality of ramp voltage paths by turning off at least one of the plurality of switching devices in the second mode.

17. The image sensor of claim 14, wherein the ramp voltage paths include a first ramp voltage path and a second ramp voltage path disposed in parallel to each other.

18. An image sensor, comprising:
 a sampler having a first input terminal for receiving a ramp voltage, and a second input terminal connected to a plurality of pixels through a column line;
 a first ramp voltage path and a second ramp voltage path for providing the ramp voltage, wherein the ramp voltage is provided to the first ramps voltage path and the second ramp voltage;
 a switching circuit configured to select at least one of the first ramp voltage path and the second ramp voltage path and connect the selected ramp voltage path to the first input terminal; and
 a control logic configured to control the switching circuit such that the first ramp voltage path is connected to the first input terminal during a first time period and such that the second ramp voltage path is connected to the first input terminal during a second time period different from the first time period, wherein the first ramp voltage path is connected to the first input terminal of the sampler and a first input terminal of another sampler without passing through the common ramp voltage path.

19. The image sensor of claim 18, wherein each of the first time period and the second time period is a period for reading a reset voltage and a pixel voltage from one of the plurality of pixels, and the second time period starts after the first time period.

20. The image sensor of claim 19, wherein the sampler includes a plurality of samplers, and the first input terminals of the samplers are connected to one of the first ramp voltage path and the second ramp voltage path in common, during at least one of the first time period and the second time period, and
 wherein portions of pixels adjacent to each other in a first direction and a second direction different from the first direction among the plurality of pixels are connected to a single column line.

* * * * *